US010836908B2

(12) United States Patent
Bruce et al.

(10) Patent No.: US 10,836,908 B2
(45) Date of Patent: Nov. 17, 2020

(54) COMPOSITION, POLYMER COMPOSITE ARTICLE FORMED THEREWITH, AND METHOD OF PREPARING SAME

(71) Applicants: DOW SILICONES CORPORATION, Midland, MI (US); DOW GLOBAL TECHNOLOGIES LLC, Midland, MI (US)

(72) Inventors: Keith Bruce, Midland, MI (US); Igor Chorvath, Midland, MI (US); Marc-Andre Courtemanche, Midland, MI (US); Jon V. Degroot, Jr., Midland, MI (US); Sean Gaal, Midland, MI (US); Craig Gross, Midland, MI (US); James Keenihan, Midland, MI (US); Shawn Mealey, Midland, MI (US); Scott Miller, Midland, MI (US); Tom Parsons, Lake Jackson, TX (US); Andrew Schlader, Lake Jackson, TX (US); Cristina Serrat, Lake Jackson, TX (US); Lauren Tonge, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/647,296

(22) PCT Filed: Feb. 1, 2019

(86) PCT No.: PCT/US2019/016329
§ 371 (c)(1),
(2) Date: Mar. 13, 2020

(87) PCT Pub. No.: WO2019/152829
PCT Pub. Date: Aug. 8, 2019

(65) Prior Publication Data
US 2020/0216668 A1    Jul. 9, 2020

Related U.S. Application Data

(60) Provisional application No. 62/624,968, filed on Feb. 1, 2018.

(51) Int. Cl.
| | |
|---|---|
| *C08L 83/04* | (2006.01) |
| *B29C 48/00* | (2019.01) |
| *C08K 3/26* | (2006.01) |
| *C08K 3/34* | (2006.01) |
| *C08L 27/06* | (2006.01) |
| *B29C 48/88* | (2019.01) |
| *B29K 27/06* | (2006.01) |
| *B29K 83/00* | (2006.01) |
| *B29K 401/00* | (2006.01) |
| *C08K 5/00* | (2006.01) |

(52) U.S. Cl.
CPC .......... *C08L 83/04* (2013.01); *B29C 48/022* (2019.02); *C08K 3/26* (2013.01); *C08K 3/34* (2013.01); *C08L 27/06* (2013.01); *B29C 48/88* (2019.02); *B29K 2027/06* (2013.01); *B29K 2083/00* (2013.01); *B29K 2401/08* (2013.01); *C08K 5/005* (2013.01); *C08K 5/0058* (2013.01); *C08K 5/0066* (2013.01); *C08K 2003/265* (2013.01)

(58) Field of Classification Search
None
See application file for complete search history.

(56) References Cited

U.S. PATENT DOCUMENTS

| | | | | |
|---|---|---|---|---|
| 4,412,016 A * | 10/1983 | Fukui | ...................... | C08K 3/34 523/206 |
| 4,535,113 A * | 8/1985 | Foster | ...................... | C08K 3/26 524/262 |
| 4,857,593 A * | 8/1989 | Leung | .................. | C08K 5/0016 525/92 B |
| 4,925,890 A | 5/1990 | Leung et al. | | |
| 4,978,436 A * | 12/1990 | Kelly | ..................... | B29C 33/68 204/165 |

(Continued)

FOREIGN PATENT DOCUMENTS

| | | |
|---|---|---|
| CA | 2370051 C | 6/2009 |
| CN | 101899181 A | 12/2010 |
| CN | 102093735 A | 6/2011 |
| CN | 101967242 B | 7/2012 |
| CN | 103374194 A | 10/2013 |
| CN | 103396676 A | 11/2013 |
| CN | 103483838 A | 1/2014 |
| CN | 103642121 A | 3/2014 |
| CN | 104761808 A | 7/2015 |

(Continued)

OTHER PUBLICATIONS

International Search Report for PCT/US2019/016329 dated Apr. 12, 2019, 6 pages.

(Continued)

*Primary Examiner* — Robert S Loewe
(74) *Attorney, Agent, or Firm* — Warner Norcross + Judd LLP

(57) ABSTRACT

A composition and a method for preparing a polymer composite article. The composition comprises (A) a filler in an amount of from 10 to 90 wt. The composition also comprises (B) a polymer in an amount of from 10 to 90 wt. %, wherein the (B) polymer is selected from polyolefins, polyamides, polyesters, or combinations thereof. Further, the composition comprises (C) an organopolysiloxane in an amount of from greater than 0 to 10 wt. %; the (C) organopolysiloxane having at least one silicon-bonded hydroxyl group and a viscosity of from 1,000 to 60,000 mPa·s at 25° C. The ranges for components (A)-(C) are based on the total weight of components (A), (B) and (C) in the composition.

17 Claims, No Drawings

(56) References Cited

U.S. PATENT DOCUMENTS

| | | | | |
|---|---|---|---|---|
| 5,169,900 | A | * | 12/1992 | Gudelis ............... C08F 255/00 |
| | | | | 428/391 |
| 5,182,173 | A | * | 1/1993 | Swei ...................... C08K 9/10 |
| | | | | 427/387 |
| 5,356,585 | A | | 10/1994 | Romenesko |
| 5,789,473 | A | | 8/1998 | Hauenstein et al. |
| 6,013,217 | A | | 1/2000 | Hauenstein et al. |
| 6,153,691 | A | * | 11/2000 | Gornowicz ............ C08L 23/06 |
| | | | | 524/861 |
| 6,288,144 | B1 | | 9/2001 | Roberts et al. |
| 6,465,552 | B1 | * | 10/2002 | Chorvath ............... C08L 67/02 |
| | | | | 524/323 |
| 6,500,883 | B1 | | 12/2002 | Mack et al. |
| 6,743,507 | B2 | | 6/2004 | Barlow et al. |
| 7,348,371 | B2 | | 3/2008 | Mehta et al. |
| 8,722,773 | B2 | | 5/2014 | Hamilton et al. |
| 9,073,295 | B2 | | 7/2015 | Przybylinski et al. |
| 9,085,671 | B2 | | 7/2015 | Van Remortel |
| 9,249,291 | B2 | * | 2/2016 | Qian ...................... C08L 51/003 |
| 9,595,365 | B2 | | 3/2017 | Esseghir |
| 2002/0091205 | A1 | * | 7/2002 | Brewer ................... C08L 83/00 |
| | | | | 525/431 |
| 2004/0014888 | A1 | * | 1/2004 | Fournier ................ C08L 83/04 |
| | | | | 525/100 |
| 2004/0204519 | A1 | | 10/2004 | Fender et al. |
| 2008/0011194 | A1 | | 1/2008 | Mecca |
| 2008/0027161 | A1 | | 1/2008 | Schlosser et al. |
| 2009/0007818 | A1 | | 1/2009 | Militz et al. |
| 2014/0316041 | A1 | | 10/2014 | Mehta |
| 2015/0225557 | A1 | * | 8/2015 | Habimana ............... C08L 23/12 |
| | | | | 523/351 |
| 2015/0306018 | A1 | | 10/2015 | Clark et al. |
| 2017/0267862 | A1 | * | 9/2017 | Lanau .................... C09J 183/06 |
| 2017/0342221 | A1 | | 11/2017 | Geck et al. |

FOREIGN PATENT DOCUMENTS

| | | | |
|---|---|---|---|
| CN | 104804452 | A | 7/2015 |
| CN | 105038283 | A | 11/2015 |
| CN | 105348835 | A | 2/2016 |
| CN | 105350741 | A | 2/2016 |
| CN | 105754364 | A | 7/2016 |
| CN | 105968803 | A | 9/2016 |
| CN | 106221220 | A | 12/2016 |
| CN | 106279922 | A | 1/2017 |
| CN | 108034171 | A | 5/2018 |
| CN | 108485123 | A | 9/2018 |
| EP | 0994151 | A1 | 4/2000 |
| EP | 1211277 | A2 | 6/2002 |
| EP | 1554337 | B1 | 11/2006 |
| EP | 2872565 | B1 | 3/2017 |
| JP | 05017632 | * | 1/1993 ............ C08L 23/00 |
| KR | 20170133720 | A | 12/2017 |
| WO | 2003104323 | A1 | 12/2003 |
| WO | 2007071732 | A1 | 6/2007 |
| WO | 2007107205 | A1 | 9/2007 |
| WO | 2011041396 | A1 | 4/2011 |
| WO | 2015024283 | A1 | 5/2015 |
| WO | 2015076970 | A1 | 5/2015 |
| WO | 2015157914 | A1 | 10/2015 |
| WO | 2015196459 | A1 | 12/2015 |

OTHER PUBLICATIONS

Schmid, Martin, "Wacker K 2016 Preview—Genioplast Additives for Wood Plastic Composites", Performance Silicones, Jun. 28, 2016.
Khalid, Nurul Izzaty et al., "The Effectiveness of Polydimethylsiloxane (PDMS) and Hexamethyldisiloxane (HMDSO) as Compatibilizer on the Preparation of Betel Nut Fiber (BNF) and Polypropylene (PP)/Polystyrene (PS) Wood Composites", The Malaysian Journal of Analytical Sciences, vol. 18, No. 3 (2014); 629-641.
Wacker, "Technical Data Sheet for Genioplast Pellet S", Version: 1.4, Jun. 11, 2014.
Wacker, "Technical Data Sheet for Genioplast HDPE 20A03", Version: 1.0, Jan. 19, 2016.
Struktol Company of America, "Technical Data Sheet for Struktol TPW 104", Apr. 28, 2016.
Wacker, "Safety Data Sheet for Genioplast HDPE 20A03", Version: 1.1, Apr. 12, 2017.
Struktol Company of America, "The Effects of Various Additives on the Processing and Physical Properties of Wood-Filled PVC", Presented at the Wood-Plastic Conference, Baltimore MD, Dec. 5, 2000.
Wacker, "Bring Out the Best in Your WPC: With Genioplast Masterbatches".
Hristov, Velichko et al., "Thermoplastic Silicone Elastomer Lubricant in Extrusion in Polypropylene Wood Flour Composites", Advances in Polymer Technology, 26:100-108, 2007.
Tullo, Alexander H., "Introducing the new Dow", Petrochemicals, vol. 96, Issue 46, Nov. 18, 2018.
Gregorio, Mauro, "Dow Consumer Solutions", Investor Day Presentation, Nov. 7, 2018.
Machine assisted English translation of CN101899181A obtained from https://patents.google.com/patent on Mar. 10, 2020, 9 pages.
Machine assisted English translation of CN101967242B obtained from https://patents.google.com/patent on Mar. 10, 2020, 7 pages.
Machine assisted English translation of CN102093735A obtained from https://patents.google.com/patent on Mar. 10, 2020, 14 pages.
Machine assisted English translation of CN103374194A obtained from https://patents.google.com/patent on Mar. 10, 2020, 8 pages.
Machine assisted English translation of CN103396676A obtained from https://patents.google.com/patent on Mar. 10, 2020, 7 pages.
Machine assisted English translation of CN103483838A obtained from https://patents.google.com/patent on Mar. 10, 2020, 9 pages.
Machine assisted English translation of CN103642121A obtained from https://patents.google.com/patent on Mar. 10, 2020, 5 pages.
Machine assisted English translation of CN104761808A obtained from https://patents.google.com/patent on Mar. 10, 2020, 6 pages.
Machine assisted English translation of CN104804452A obtained from https://patents.google.com/patent on Mar. 10, 2020, 21 pages.
Machine assisted English translation of CN105038283A obtained from https://patents.google.com/patent on Mar. 10, 2020, 7 pages.
Machine assisted English translation of CN105348835A obtained from https://patents.google.com/patent on Mar. 10, 2020, 5 pages.
Machine assisted English translation of CN105350741A obtained from https://patents.google.com/patent on Mar. 10, 2020, 6 pages.
Machine assisted English translation of CN105754364A obtained from https://patents.google.com/patent on Mar. 10, 2020, 5 pages.
Machine assisted English translation of CN105968803A obtained from https://patents.google.com/patent on Mar. 10, 2020, 7 pages.
Machine assisted English translation of CN106221220A obtained from https://patents.google.com/patent on Mar. 10, 2020, 10 pages.
Machine assisted English translation of CN106279922A obtained from https://patents.google.com/patent on Mar. 10, 2020, 6 pages.
Machine assisted English translation of CN108034171A obtained from https://patents.google.com/patent on Mar. 10, 2020, 9 pages.
Machine assisted English translation of CN108485123A obtained from https://patents.google.com/patent on Mar. 10, 2020, 5 pages.
Machine assisted English translation of KR20170133720A obtained from https://patents.google.com/patent on Mar. 11, 2020, 7 pages.
Machine assisted English translation of EP1211277A2 obtained from https://patents.google.com/patent on Mar. 11, 2020, 12 pages.
Machine assisted English translation of WO2007107205A1 obtained from https://patentsgoogle.com/patent on Mar. 11, 2020, 14 pages.
Machine assisted English translation of WO2015024283A1 obtained from https://patentsgoogle.com/patent on Mar. 11, 2020, 9 pages.

* cited by examiner

COMPOSITION, POLYMER COMPOSITE ARTICLE FORMED THEREWITH, AND METHOD OF PREPARING SAME

CROSS-REFERENCE TO RELATED APPLICATIONS

This application is the National Stage of International Appl. No. PCT/US2019/016329 filed on 1 Feb. 2019, which claims priority to and all advantages of U.S. Appl. No. 62/624,968, filed on 1 Feb. 2018, the contents of which are hereby incorporated by reference.

FIELD OF THE INVENTION

The present invention generally relates to a composition and, more specifically, to a composition for preparing a polymer composite article, to methods of preparing the composition and the polymer composite article therewith, and to the polymer composite article formed thereby.

DESCRIPTION OF THE RELATED ART

Polymer composite articles are known in the art and are utilized in various end use applications. Polymer composite articles are increasingly popular with consumers due to cost and desirable properties associated with polymer composite articles, including physical and mechanical properties.

Certain polymer composite articles contain a high percentage by weight of fillers. Such polymer composite articles are typically produced by thoroughly mixing fillers and polymer to give a mixture. The mixture can be molded (e.g., injection molded) or extruded to form the polymer composite articles. Depending on a selection of the polymer utilized to form the polymer composite article, the polymer composite article may be cured and/or vulcanized. However, conventional processes for producing polymer composite articles generally require a process aid (which can be internal or external) to facilitate forming the polymer composite articles from the mixture to ensure quality (e.g. smoothness of surface and edges). Conventional, low cost, organic process aids generally suffer from the drawback of requiring high loading to achieve faster production speeds, thereby impacting cost and/or performance properties. In addition, many conventional process aids may negatively affect physical properties and reduce mechanical properties (impact resistance, flexural strength, flexural modulus) of the composite articles, especially at elevated use temperatures. Conventional process aids may also migrate from the polymer composite articles, thus negatively impacting one or more properties of the polymer composite articles over time, such as physical properties, appearance, feel, ability to overmold, ability to co-extrude, ability to adhere to the surface, ability to print the surface and ability to paint the surface of the polymer composite articles. In addition some of the organic process aids volatilize at higher application temperatures, which can lead to formation or bubbles and cracks in the polymer composite articles, which can compromise long term performance of these articles.

BRIEF SUMMARY OF THE INVENTION

The present invention provides a composition for preparing a polymer composite article. The composition comprises (A) a filler in an amount of from 10 to 90 wt. %. The composition also comprises (B) a polymer in an amount of from 10 to 90 wt. %, wherein the (B) polymer is selected from polyolefins, polyamides, polyesters, or combinations thereof. Further, the composition comprises (C) an organopolysiloxane in an amount of from greater than 0 to 10 wt. %; the (C) organopolysiloxane having at least one silicon-bonded hydroxyl group and a viscosity of from 1,000 to 60,000 mPa·s at 25° C. The ranges for components (A)-(C) are based on the total weight of components (A), (B) and (C) in the composition.

A method of preparing the composition is also provided. The method of preparing the composition comprises combining the (A) filler, the (B) polymer, and the (C) organopolysiloxane, thereby preparing the composition.

Further, a method for preparing a polymer composite article is provided by the present invention. The method comprises preparing the polymer composite article from the composition. In addition, a polymer composite article formed in accordance with the method is also provided.

Further, a solid carrier component comprising the (C) organopolysiloxane and at least one other component is also provided.

DETAILED DESCRIPTION OF THE INVENTION

The present invention provides a composition for preparing a polymer composite article. The polymer composite article has excellent physical properties and is suitable for myriad end use applications, as described below. A method of preparing a polymer composite article and the polymer composite article formed thereby are also provided and described below.

The composition for preparing a polymer composite article comprises: (A) a filler in an amount of from 10 to 90 wt. %; (B) a polymer in an amount of from 10 to 90 wt. %; and (C) an organopolysiloxane in an amount of from greater than 0 to 10 wt. %; each based on the total weight of components (A), (B) and (C) in the composition.

Component (A) Filler

The composition comprises (A) a filler. The (A) filler may form a discontinuous phase in the composition for preparing the polymer composite article and the composite article so prepared. The (A) filler is not limited and may be, for example, a reinforcing filler, an extending filler, a thermally conductive filler, an electrically conductive filler, a flame retarding filler, an acid accepting filler, a rheologically modifying filler, a lignocellulosic filler, a coloring filler, a mineral filler, a glass filler, a carbon filler, or a combination thereof. The selection of the (A) filler is typically a function of the polymer composite article to be formed with the composition and the end use applications of the polymer composite article.

In certain embodiments, the (A) filler comprises at least one hydroxide or hydroxyl functional group, and/or water. Typically, the at least one hydroxide or hydroxyl functional group (or water) is chemically and/or physically bonded to a surface of the (A) filler. Without wishing to be bound by theory, it is believed that if the (A) filler has this property, then it is possible for an organopolysiloxane to react or physically interact with and surface treat the (A) filler.

The (A) filler may be untreated, pretreated, or added in conjunction with an optional filler treating agent, described below, which when so added may treat the (A) filler in situ or prior to incorporation of the (A) filler in the composition. The (A) filler may be a single filler or a combination of two or more fillers that differ in at least one property such as type of filler, method of preparation, treatment or surface chemistry, filler composition, filler shape, filler surface area, average particle size, and/or particle size distribution.

The shape and dimensions of the (A) filler is also not specifically restricted. For example, the (A) filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the (A) filler utilized, the selection of other components included within the composition, and the end use application of the polymer composite article formed therewith.

Non-limiting examples of fillers that may function as reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

Non-limiting examples fillers that may function as extending or reinforcing fillers include quartz and/or crushed quartz, aluminum oxide, magnesium oxide, silica (e.g. fumed, ground, precipitated), hydrated magnesium silicate, magnesium carbonate, dolomite, silicone resin, wollastonite, soapstone, kaolinite, kaolin, mica muscovite, phlogopite, halloysite (hydrated alumina silicate), aluminum silicate, sodium aluminosilicate, glass (fiber, beads or particles, including recycled glass, e.g. from wind turbines or other sources), clay, magnetite, hematite, calcium carbonate such as precipitated, fumed, and/or ground calcium carbonate, calcium sulfate, barium sulfate, calcium metasilicate, zinc oxide, talc, diatomaceous earth, iron oxide, clays, mica, chalk, titanium dioxide (titania), zirconia, sand, carbon black, graphite, anthracite, coal. lignite. charcoal, activated carbon, non-functional silicone resin, alumina, silver, metal powders, magnesium oxide, magnesium hydroxide, magnesium oxysulfate fiber, aluminum trihydrate, aluminum oxyhydrate, coated fillers, carbon fibers (including recycled carbon fibers, e.g. from the aircraft and/or automotive industries), poly-aramids such as chopped KEVLAR™ or Twaron™, nylon fibers, mineral fillers or pigments (e.g. titanium dioxide, non-hydrated, partially hydrated, or hydrated fluorides, chlorides, bromides, iodides, chromates, carbonates, hydroxides, phosphates, hydrogen phosphates, nitrates, oxides, and sulfates of sodium, potassium, magnesium, calcium, and barium; zinc oxide, antimony pentoxide, antimony trioxide, beryllium oxide, chromium oxide, lithopone, boric acid or a borate salt such as zinc borate, barium metaborate or aluminum borate, mixed metal oxides such as vermiculite, bentonite, pumice, perlite, fly ash, clay, and silica gel; rice hull ash, ceramic and, zeolites, metals such as aluminum flakes or powder, bronze powder, copper, gold, molybdenum, nickel, silver powder or flakes, stainless steel powder, tungsten, barium titanate, silica-carbon black composite, functionalized carbon nanotubes, cement, slate flour, pyrophyllite, sepiolite, zinc stannate, zinc sulphide), and combinations thereof. Alternatively the extending or reinforcing filler may be selected from the group consisting of calcium carbonate, talc and a combination thereof.

Extending fillers are known in the art and commercially available; such as a ground silica sold under the name MIN-U-SIL by U.S. Silica of Berkeley Springs, W. Va. Suitable precipitated calcium carbonates include Winnofil™ SPM from Solvay and Ultra-pflex™ and Ultra-pflex™ 100 from SMI.

When the (A) filler comprises a thermally conductive filler, the (A) filler may be both thermally conductive and electrically conductive. Alternatively, the (A) filler may be thermally conductive and electrically insulating. A thermally conductive filler may also have other beneficial properties, such as, but not limited to, a reinforcing filler, an extending filler, or another property as described above. The thermally conductive filler may be selected from, but not limited to, the group consisting of aluminum nitride, aluminum oxide, aluminum trihydrate, aluminum oxyhydrate, barium titanate, barium sulfate, beryllium oxide, carbon fibers, diamond, graphite, magnesium hydroxide, magnesium oxide, magnesium oxysulfate fiber, metal particulate, onyx, silicon carbide, tungsten carbide, zinc oxide, coated fillers, and a combination thereof.

When the (A) filler comprises the thermally conductive filler, the thermally conductive filler may comprise a metallic filler, an inorganic filler, a meltable filler, or a combination thereof. Metallic fillers include particles of metals, metal powders, and particles of metals having layers on the surfaces of the particles. These layers may be, for example, metal nitride layers or metal oxide layers. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces. Inorganic fillers are exemplified by onyx; aluminum trihydrate, aluminum oxyhydrate, metal oxides such as aluminum oxide, beryllium oxide, magnesium oxide, and zinc oxide; nitrides such as aluminum nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point from 50° C. to 250° C. The meltable filler may be a eutectic alloy, a non-eutectic alloy, or a pure metal. Many suitable meltable fillers are commercially available.

Alternatively, the (A) filler may comprise a non-reactive silicone resin. For example, the (A) filler may comprise a non-reactive MQ silicone resin. As known in the art, M siloxy units are represented by $R^O{}_3SiO_{1/2}$, and Q siloxy units are represented by $SiO_{4/2}$, where $R^O$ is an independently selected substituent. Such non-reactive silicone resins are typically soluble in liquid hydrocarbons such as benzene, toluene, xylene, heptane and the like or in liquid organosilicon compounds such as a low viscosity cyclic and linear polydiorganosiloxanes. The molar ratio of M to Q siloxy units in the non-reactive silicone resin may be from 0.5/1 to 1.5/1, alternatively from 0.6/1 to 0.9/1. These mole ratios can be conveniently measured by Silicon 29 Nuclear Magnetic Resonance Spectroscopy ($^{29}$Si NMR), which is described in U.S. Pat. No. 9,593,209 Reference Example 2 in col. 32, which is incorporated by reference herein. The non-reactive silicone resin may further comprise 2.0 wt. % or less, alternatively 0.7 wt. % or less, alternatively 0.3 wt. % or less, of T units including a silicon-bonded hydroxyl or a hydrolyzable group, exemplified by alkoxy such as methoxy and ethoxy, and acetoxy, while still being within the scope of such non-reactive silicone resins. The concentration of hydrolyzable groups present in the non-reactive silicone resin can be determined using Fourier Transform-Infrared (FT-IR) spectroscopy.

Alternatively or in addition, the (A) filler may comprise a non-reactive silicone resin other than the non-reactive MQ silicone resin described immediately above. For example, the (A) filler may comprise a T resin, a TD resin, a TDM resin, a TDMQ resin, or any other non-reactive silicone resin. Typically, such non-reactive silicone resins include at least 30 mole percent T siloxy and/or Q siloxy units. As known in the art, D siloxy units are represented by $R^O_2SiO_{2/2}$, and T siloxy units are represented by $R^OSiO_{3/2}$, where $R^O$ is an independently selected substituent.

The weight average molecular weight, $M_W$, of the non-reactive silicone resin will depend at least in part on the molecular weight of the silicone resin and the type(s) of substituents (e.g. hydrocarbyl groups) that are present in the non-reactive silicone resin. $M_W$ as used herein represents the weight average molecular weight measured using conventional gel permeation chromatography (GPC), with narrow molecular weight distribution polystyrene (PS) standard calibration, when the peak representing the neopentamer is excluded from the measurement. The PS equivalent $M_W$ of the non-reactive silicone resin may be from 12,000 to 30,000 g/mole, typically from 17,000 to 22,000 g/mole. The non-reactive silicone resin can be prepared by any suitable method. Silicone resins of this type have been prepared by cohydrolysis of the corresponding silanes or by silica hydrosol capping methods generally known in the art.

In certain embodiments, the (A) filler may comprise an acid acceptor. The acid acceptor may comprise a metal oxide such as magnesium oxide. Acid acceptors are generally known in the art and are commercially available under trade names including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA.

In these or other embodiments, the (A) filler may comprise a lignocellulosic-based filler. The lignocellulosic-based filler comprises, alternatively consists essentially of, alternatively consists of, a lignocellulosic material. Typically, the lignocellulosic-based filler consists of the lignocellulosic material. The lignocellulosic-based filler, as well as the lignocellulosic material, may comprise any matter derived from any plant source. When the lignocellulosic-based filler consists essentially of or consists of lignocellulosic material, the lignocellulosic material may also include some water or moisture content, although the lignocellulosic material, as well as the lignocellulosic-based filler, is typically dry, i.e., does not contain any free moisture content but for that which may be associated with the relative humidity in an environment in which the lignocellulosic-based filler is prepared, derived, formed, and/or stored. The same is typically true for other species of the (A) filler, but is noted in regards to lignocellulosic-based fillers as lignocellulosic materials generally include some water content as harvested/prepared prior to any drying or end use.

The lignocellulosic-based filler typically comprises carbohydrate polymers (e.g. cellulose and/or hemicellulose), and may further comprise an aromatic polymer (e.g. lignin). The lignocellulosic-based filler is typically a natural lignocellulosic material, i.e., is not synthetically derived. For example, the lignocellulosic-based filler is typically derived from wood (hardwood, softwood, and/or plywood). Alternatively or in addition, the lignocellulosic-based filler may comprise lignocellulosic material from other non-wood sources, such as lignocellulosic material from plants, or other plant-derived polymers, for example agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof.

Specific examples of suitable hardwoods from which the lignocellulosic-based filler may be derived include, but are not limited to, ash, aspen, cottonwood, basswood, birch, beech, chestnut, gum, elm eucalyptus, maple, oak, poplar, sycamore, and combinations thereof. Specific examples of suitable softwoods from which the lignocellulosic-based filler may be derived include, but are not limited to, spruce, fir, hemlock, tamarack, larch, pine, cypress, redwood, and combinations thereof. Combinations of different hardwoods, combinations of different softwoods, combinations of hardwood(s) and softwood(s), or combinations of one or both of hardwoods and softwoods with plywood, may be utilized together as the lignocellulosic-based filler. The lignocellulosic-based filler may be virgin, recycled, or a combination thereof.

The lignocellulosic-based filler may have any form and size, e.g., from nanometer to millimeter particle size. For example, the lignocellulosic-based filler may comprise a powder, a pulp, a flour, sawdust, a fiber, a flake, a chip, a shaving, a strand, a scrim, a wafer, a wool, a straw, a particle, or any combination thereof. The lignocellulosic-based filler may be formed via a variety of techniques known to one of skill in the art, typically as a function of the form thereof. For example, the lignocellulosic-based filler can be prepared by comminuting logs, branches, industrial wood residue, rough pulpwood, etc. The lignocellulosic-based filler may be comminuted to a desired particle size. For example, the lignocellulosic-based filler may be comminuted with any convenient equipment, such as a hammer mill, which results in the lignocellulosic-based filler having a particle size suitable for use in mixing processes. The desired particle size is typically selected by one of skill in the art based on the particular mixing process utilized and desired properties of the polymer composite article. By particle size, it is meant the dimensions of the lignocellulosic-based filler, regardless of shape, and includes, for example, dimensions associated with the lianocellulosic-based filler when in the form of fibers. As known in the art, lignocellulosic-based fillers may be pelletized, or otherwise in the form of pellets, which may substantially maintain shape and dimension when incorporated into the composition or which may form smaller particles in the composition.

Alternatively, the (A) filler may comprise a polysaccharide filler, which may comprise both a cellulose or hemicellulose derivative and optionally lignin. Alternatively, the polysaccharide filler may consist essentially of, alternatively consist of polymers consisting of subunits of B-D glucose. Alternatively, the polysaccharide filler may comprise starches, pullulans, pectins, dextrans, alginates or animal derived polysaccharides such as chitin and chitosan.

In certain embodiments, the (A) filler is selected from a lignocellulosic filler, a mineral filler, a glass filler, a carbon filler, and combinations thereof. In certain embodiments, the (A) filler consists essentially of a lignocellulosic filler, a mineral filler, a glass filler, a carbon filler, and combinations thereof. In specific embodiments, the (A) filler consist of a lignocellulosic filler, a mineral filler, a glass filler, a carbon filler, and combinations thereof. When the (A) filler comprises the mineral filler, the mineral filler is typically selected from calcium carbonate ($CaCO_3$) and/or talc. In such embodiments, the mineral filler may be a reinforcing filler, an extending filler, or both in the composition and the plastic composite article formed therewith. The selection of the (A) filler is typically a function of the polymer composite article to be formed with the composition and the end use applications of the polymer composite article.

Regardless of the selection of the (A) filler, the (A) filler may be untreated, pretreated, or added to form the composition in conjunction with an optional filler treating agent, which when so added may treat the (A) filler in situ in the composition.

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, an organosilicon compound, a stearate, or a fatty acid. The filler treating agent may comprise a single filler treating agent, or a combination of two or more filler treating agents selected from similar or different types of molecules.

The filler treating agent may comprise an alkoxysilane, which may be a mono-alkoxysilane, a di-alkoxysilane, a tri-alkoxysilane, or a tetra-alkoxysilane. Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof. In certain aspects the alkoxysilane(s) may be used in combination with silazanes, which catalyze the less reactive alkoxysilane reaction with surface hydroxyls. Such reactions are typically performed above 100° C. with high shear with the removal of volatile by-products such as ammonia, methanol and water.

Suitable filler treating agents also include alkoxysilyl functional alkylmethyl polysiloxanes, or similar materials where the hydrolyzable group may comprise, for example, silazane, acyloxy or oximo.

Alkoxy-functional oligosiloxanes can also be used as filler treating agents. Alkoxy-functional oligosiloxanes and methods for their preparation are generally known in the art. Other filler treating agents include mono-endcapped alkoxy functional polydiorganosiloxanes, i.e., polyorganosiloxanes having alkoxy functionality at one end.

Alternatively, the filler treating agent can be any of the organosilicon compounds typically used to treat silica fillers. Examples of organosilicon compounds include organochlorosilanes such as methyltrichlorosilane, dimethyldichlorosilane, and trimethyl monochlorosilane; organosiloxanes such as hydroxy-endblocked dimethylsiloxane oligomer, silicon hydride functional siloxanes, hexamethyldisiloxane, and tetramethyldivinyldisiloxane; organosilazanes such as hexamethyldisilazane and hexamethylcyclotrisilazane; and organoalkoxysilanes such as alkylalkoxysilanes with Methyl, Propyl, n-Butyl, i-Butyl, n-Hexyl, n-Octyl, i-Octyl, n-Decyl, dodecyl, tetradecyl, hexadecyl, or octadecyl substituents. Organoreactive alkoxysilanes can include amino, methacryloxy, vinyl, glycidoxy, epoxycyclohexyl, isocyanurato, isocyanato, mercapto, sulfido, vinyl-benzyl-amino, benzyl-amino, or phenyl-amino substituents. Alternatively, the filler treating agent may comprise an organopolysiloxane. The use of such a filler treating agent to treat the surface of the (A) filler may take advantage of multiple hydrogen bonds, either clustered or dispersed or both, as the method to bond the organosiloxane to the surface of the (A) filler. The organosiloxane capable of hydrogen bonding has an average, per molecule, of at least one silicon-bonded group capable of hydrogen bonding. The group may be selected from: a monovalent organic group having multiple hydroxyl functionalities or a monovalent organic group having at least one amino functional group. Hydrogen bonding may be a primary mode of bonding of the organosiloxane to the (A) filler. The organosiloxane may be incapable of forming covalent bonds with the (A) filler. The organosiloxane capable of hydrogen bonding may be selected from the group consisting of a saccharide-siloxane polymer, an amino-functional organosiloxane, and a combination thereof. Alternatively, the polyorganosiloxane capable of hydrogen bonding may be a saccharide-siloxane polymer.

Alternatively, the filler treating agent may comprise alkylthiols such as octadecyl mercaptan and others, and fatty acids such as oleic acid, stearic acid, titanates, titanate coupling agents, zirconate coupling agents, and a combination thereof. One skilled in the art could optimize a filler treating agent to aid dispersion of the (A) filler without undue experimentation.

If utilized, the relative amount of the filler treatment agent and the (A) filler is selected based on the particular filler utilized as well as the filler treatment agent, and desired effect or properties thereof.

The (A) filler is present in the composition in an amount of from 10 to 90, alternatively from 10 to 80, alternatively from 20 to 75, alternatively 30 to 70, and alternatively from 45 to 65, weight percent based on the total weight of the composition. In certain other embodiments, the (A) filler is present in the composition in an amount of from 20 to 50 weight percent based on the total weight of the composition. Alternatively, the (A) filler may be present in an amount of from 65 to 85, alternatively 70 to 80, weight percent based on total weight of the composition for certain applications, such as wood-plastic composites or mineral filled composites containing a polyolefin polymer. Alternatively, for certain applications, it is desirable to maximize the relative amount of the (A) filler in the composition, which reduces overall cost thereof, so long as desirable properties of the polymer composite article formed therewith are maintained or obtained. One of skill in the art understands that the amount of the (A) filler may be modified for this purpose, including a balance of cost and resulting properties, as well as the presence or absence of other optional components, as described below.

In specific embodiments, the (B) polymer comprises, alternatively is, an olefin and the (A) filler comprises, alternatively is, a lignocellulosic filler such that the polymer composite article formed thereby is a wood plastic composite. Typically, the olefin is polyethylene. In such embodiments, the (A) filler may be present in an amount of from 10 to 80, alternatively from 15 to 80, alternatively from 20 to 80, alternatively from 25 to 80, alternatively from 30 to 80, alternatively from 35 to 80, alternatively from 40 to 80, weight percent based on the combined weight of components (A), (B) and (C). In other such embodiments, the (A) filler may be present in an amount of from 10 to 60, alternatively from 15 to 60, alternatively from 20 to 60, alternatively from 25 to 60, alternatively from 30 to 60, alternatively from 35 to 60, alternatively from 40 to 60, weight percent based on the combined weight of components (A), (B) and (C). In yet other such embodiments, the (A) filler may be present in an amount of from 10 to 40, alternatively from 15 to 40, alternatively from 20 to 40, alternatively from 25 to 40, alternatively from 30 to 40, alternatively from 35 to 40, weight percent based on the combined weight of components (A), (B) and (C). Alternatively still, the (A) filler may be present in an amount of from 10 to 20 weight percent based on the combined weight of components (A), (B) and (C).

In other specific embodiments, the (A) filler comprises, alternatively is, a mineral filler, a glass fiber, a carbon fiber, or combinations thereof. In such embodiments, the (A) filler may be present in an amount of from 10 to 60, alternatively from 15 to 55, alternatively from 20 to 60, alternatively from 20 to 55, alternatively from 20 to 50, alternatively from 20 to 45, alternatively from 20 to 40, weight percent based on the combined weight of components (A), (B) and (C).

Further still, the (A) filler may comprise a blend of different types of fillers. For example, when the composition is utilized to prepare a wood plastic composite, the (A) filler may comprise a blend of a lignocellulosic filler and a reinforcing filler, e.g. talc and/or calcium carbonate. Further, specific fillers, such as those for fire resistance, can also be included to customize or selectively control or improve properties of the polymer composite article. In such embodiments, the composition may comprise, for example, up to 50 weight percent lignocellulosic filler, up to 20 weight percent mineral filler, and optionally some lesser amount of other types of filler, each based on the combined weight of components (A), (B) and (C).

(B) Polymer

The composition further comprises (B) a polymer. The polymer may form all or a part of a continuous phase in the composition for preparing the polymer composite article and the composite article prepared therefrom. In specific embodiments, the (B) polymer is a thermoplastic. In other specific embodiments, the (B) polymer is an elastomer. The selection of the (B) polymer is typically a function of the desired end use application of the polymer composite article formed with the composition, as various polymers have different melting point temperatures (and/or glass transition temperatures) and physical/mechanical properties, as well as suitable or acceptable continuous use application temperatures. In certain embodiments, the (B) polymer has a softening point temperature that is less than a degradation temperature of other components in the composition. In these embodiments, the (B) polymer has softening point temperature of less than 425° C., alternatively less than 400° C., alternatively less than 375° C. The softening point temperature may also be referred to as the processing temperature. The (B) polymer is selected from polyolefins, polyamides, polyesters, and combinations thereof.

Non-limiting examples of suitable polymers include polyolefins (e.g. polyethylenes (PE), polypropylenes (PP), polybutylenes, poly (1-butene), polyisobutene, poly(l-pentene), poly(3-methyl-1-pentene), poly(4-methyl-1-hexene), poly (5-methyl-1-hexene), etc.), polycycloolefins, polyamides (e.g. nylon 6, nylon 66, etc.), polyesters, and combinations thereof. In specific embodiments, the (B) polymer is selected from a polyethylene, a polypropylene, a polyamide, and a polyester. In one embodiment, the (B) polymer is polyethylene. In another embodiment, the (B) polymer is polypropylene. In yet another embodiment, the (B) polymer is a polyamide. Alternatively, the (B) polymer is a polyester. These polymers may alternatively be referred to as plastics. Additionally, elastomers and/or rubbers can be added to or compounded with the (B) polymer to modify or improve properties, such as impact strength.

In certain embodiments, the (B) polymer comprises a polyolefin, a polyamide, a polyester, or a combination thereof. In other embodiments, the (B) polymer consists essentially of a polyolefin, a polyamide, a polyester, or a combination thereof. By consist essentially of, it is meant that the (B) polymer can include one or more additional polymers other than a polyolefin, a polyamide, a polyester, or a combination thereof so long as such additional polymers can be processed along with the (B) polymer to form the polymer composite article. In yet other embodiments, the (B) polymer consists of a polyolefin, a polyamide, a polyester, or a combination thereof. When the (B) polymer does not consist of a polyolefin, a polyamide, a polyester, or a combination thereof, the (B) polymer typically includes a polyolefin, a polyamide, a polyester, or a combination thereof in an amount of at least 50, alternatively at least 60, alternatively at least 65, alternatively at least 70, alternatively at least 75, alternatively at least 80, alternatively at least 85, alternatively at least 90, alternatively at least 95, alternatively at least 96, alternatively at least 97, alternatively at least 98, alternatively at least 99, wt. % based on the total weight of the (B) polymer utilized in the composition.

When the (B) polymer comprises a polymer other than and in addition to a polyolefin a polyamide, and a polyester, the (B) polymer may further comprise polyvinyls (e.g. polyvinyl chloride, polyvinyl alcohol, polyvinyl ester (vinylester)), polycarbonates, polystyrenes, polyimides, polyphenylene sulfides; polyphenylene ethers; polyamideimides, polyoxymethylenes (POM), ethylene vinyl alcohol (EVOH), ethylene vinyl acetate (EVA), ethylene alkyl (meth)acrylates, ethylene propylene diene monomer (EPDM), ethylene propylene rubber (EPR), acrylics (e.g. polymethylmethacrylate), celluloses (e.g. triacetylcellulose, diacetylcellulose, cellophane, etc.), polyurethanes, polyetherimides (PEI); polysulfones (PSU); polyethersulfones; polyketones (PK); polyetherketones (PEK); polyetheretherketones (PEEK); polyetherketoneketones (PE KK); polyarylates (PAR); polyethernitriles (PEN); polysulfones; polyethersulfones; polyphenylsulfones; polyetherimides; resol-type; urea (e.g. melamine-type); ABS (acrylonitrile butadiene styrenic polymer), fluorinated resins, such as polytetrafluoroethylenes; thermoplastic vulcanizates; styrenics; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The (B) polymer may further comprise an elastomer. Non-limiting examples of elastomers include styrene-butadiene rubber, polyether urethane rubber, polyester urethane rubber, butyl rubber, nitrile rubber, chloroprene rubber (neoprene), polyacrylate rubber, ethylene acrylate rubber, ethylene-propylene rubber, ethylene-propylene-diene rubber, ethylene propylene diene monomer (EPDM), ethylene propylene rubber (EPR), fluorosilicone rubber, fluorocarbon rubber, perfluorianted elastomer, styrene butadiene rubber, chlorosulfonated polyethylene, polyisoprene rubber, polysulfide rubber, ethylene acrylate rubber, epichlorohydrine rubber, perfluoroelastomer (e.g. Kalrez™), polysulfide rubber, and combinations thereof.

In certain embodiments, the (B) polymer comprises, alternatively is, polyethylene. The polyethylene may be selected from High Density Polyethylene (HDPE), Medium Density Polyethylene (MDPE), Low Density Polyethylene (LDPE), Linear Low Density Polyethylene (LLDPE), Very Low Density Polyethylene (VLDPE), Ultra Low Density Polyethylene (ULDPE), Low Density Low Molecular Weight Polyethylene (LDLMWPE) or a combination thereof.

In certain embodiments, the (B) polymer comprises an ethylene-based polymer. In these embodiments, the ethylene-based polymer is an ethylene/α-olefin interpolymer, and further an ethylene/α-olefin copolymer. In one embodiment, the α-olefin has less than, or equal to, 20 carbon atoms. For example, the α-olefin comonomers may have 3 to 10 carbon atoms, and alternatively 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-butene, 1-hexene and 1-octene, and further 1-hexene and 1-octene.

In these or other embodiments, the (B) polymer comprises, alternatively is, a polyamide. Examples of suitable polyamides include polycaproamides (e.g. Nylon 6), polyhexamethyleneadipamides (e.g. Nylon 66), polytetramethyleneadipamides (e.g. Nylon 46), polyhexamethylenesebacamides (e.g. Nylon 6/10), polyhexamethylenedodecamides (e.g. Nylon 6/12), polyhexamethylenedodecanediamides (e.g. Nylon 66), polyundecaneamides, polydodecaneamides, hexamethyleneadipamide/caproamide copolymers (e.g. Nylon 66/6), polyundecanoamides (Nylon 11), polylauryllactams (e.g. Nylon 12) caproamide/hexamethyleneterephthalamide copolymers (e.g. Nylon 6/6T), polyhexamethyleneazelamides (e.g. Nylon 6/9), polyhexamethyleneterephthalamides (e.g. Nylon 6T), polyphthalamides, hexamethyleneadipamide/hexamethyleneterephthalamide copolymers (e.g. Nylon 66/6T) hexamethyleneadipamide/hexamethyleneisophthalamide copolymers (e.g. Nylon 66/6I), hexamethyleneadipamide/hexamethyleneisophthalamide/caproamide copolymers (e.g. Nylon 66/6I/6), hexamethyleneadipamide/hexamethyleneterephthalamid/carpoamide copolymers (e.g. Nylon 66/6T/6), hexamethyleneterephthalamide/hexamethyleneisophthalamide copolymers (e.g. Nylon 6T/6I), hexamethyleneterephthalamide/dodecanamide copolymers (e.g. Nylon 6T/12), hexamethyleneadipamide/hexamethyleneterephthalamide/hexamethyleneisophthalamide copolymers (e.g. Nylon 66/6T/6I), polyxylyleneadipamides, hexamethyleneterephthalamide/2-methylpentamethyleneterephthalamide copolymers, polymetaxylylenediamineadipamides (e.g. Nylon MXD6), polynonamethyleneterephthalamides (e.g. Nylon 9T), and combinations thereof. The polyamide resin may be an aromatic polyamide (polyaramide).

In yet other embodiments, the (B) polymer comprises, alternatively is, a polyester.

Polyesters and methods of their preparation are known in the art. For example, polyesters may be prepared via a conventional esterification process using a hydroxyl compound (e.g. an aromatic and/or aliphatic alcohol or glycol) and an acid. The hydroxyl compound is typically a polyhydric alcohol.

Specific examples of hydroxyl compounds suitable for preparing polyesters include ethylene glycol, diethylene glycol, propylene glycol, dipropylene glycol, trimethylene glycol, 1,3-propanediol, 1,2-butane diol, 1,3-butanediol, 1,4-butanediol, 1,2-pentanediol, 1,4-pentanediol, neopentyl glycol, 1,5-pentanediol, 1,6-hexanediol, 1,7-heptanediol, glycerol, 1,1,1-trimethylolpropane, 1,1,1-trimethylolethane, 1,2,6-hexanetriol, decanediol, dodecanediol a-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

Specific examples of acids suitable for preparing polyesters include polycarboxylic acids, including oxalic acid, malonic acid, succinic acid, glutaric acid, adipic acid, 2-methyl-1,6-hexanoic acid, pimelic acid, suberic acid, azelaic acid, sebacic acid, brassylic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, phthalic acid, isophthalic acid and 1,4-cyclohexanedicarboxylic acid.

Other methods of preparing polyesters are also known. For example, polyesters may comprise ring-opened polymers of a cyclic lactone, polycondensation products of a hydroxycarboxylic acid, polycondensation products of a dibasic acid and a polyol, and transesterification of an ester compound with a hydroxyl compound or another ester compound.

Regardless of the (B) polymer utilized, the (B) polymer can comprise virgin polymer and/or recycled polymer. The recycled polymer, if utilized, may be sourced from industrial production streams, as well as from post-industrial and/or post-consumer sources. The selection of the (B) polymer, as well as any ratio of virgin polymer to recycled polymer, if utilized in concert, is typically a function of cost and desired properties of the polymer composite article formed therewith.

The (B) polymer may be present in the composition in an amount of from 10 to 90, alternatively from 20 to 90, alternatively from 25 to 80, alternatively from 30 to 70, alternatively from 35 to 55, alternatively from 40 to 50, weight percent based on the total weight of the composition. In specific embodiments, it is desirable to minimize the relative amount of the (B) polymer in the composition, which may reduce overall cost thereof depending on selection, so long as desirable properties of the polymer composite article formed therewith are maintained or obtained. One of skill in the art understands that the amount of the (B) polymer may be modified for this purpose, including a balance of cost and resulting properties, as well as the presence or absence of other optional components, as described below.

In specific embodiments, the (B) polymer comprises, alternatively is, an olefin and the (A) filler comprises, alternatively is, a lignocellulosic filler such that the polymer composite article formed thereby is a wood plastic composite. Typically, the olefin is polyethylene. In such embodiments, the (B) polymer may be present in an amount of from 10 to 90, alternatively from 15 to 80, alternatively from 20 to 75, alternatively from 20 to 70, alternatively from 20 to 65, alternatively from 20 to 60, weight percent based on the combined weight of components (A), (B) and (C). In other such embodiments, the (B) polymer may be present in an amount of from 40 to 90, alternatively from 40 to 85, alternatively from 40 to 80, alternatively from 40 to 75, alternatively from 40 to 70, alternatively from 40 to 65, alternatively from 40 to 60, weight percent based on the combined weight of components (A), (B) and (C). In yet other such embodiments, the (B) polymer may be present in an amount of from 60 to 90, alternatively from 60 to 85, alternatively from 60 to 80, alternatively from 60 to 75, alternatively from 60 to 70, alternatively from 60 to 65, weight percent based on the combined weight of components (A), (B) and (C). Alternatively still, the (B) polymer may be present in an amount of from 80 to 90 weight percent based on the combined weight of components (A), (B) and (C).

In other specific embodiments, the (A) filler comprises, alternatively is, a mineral filler, a glass fiber, a carbon fiber, or combinations thereof. In such embodiments, the (B) polymer may be present in an amount of from 40 to 90, alternatively from 45 to 85, alternatively from 40 to 80, alternatively from 45 to 80, alternatively from 50 to 80, alternatively from 55 to 80, alternatively from 60 to 80, weight percent based on the combined weight of components (A), (B) and (C).

(C) Organopolysiloxane

The composition further comprises (C) an organopolysiloxane. The (C) organopolysiloxane has at least one silicon-bonded hydroxyl group. The (C) organopolysiloxane has a viscosity of at least 120 mPa·s at 25° C., alternatively from 120 mPa·s to 250,000 mPa·s. In certain embodiments, the (C) organopolysiloxane has a viscosity of from 1,000 to 60,000, alternatively from 1,000 to 50,000, alternatively from 2,000 to 50,000, mPa·s at 25° C. Viscosity may be measured at 25° C. at 0.1 to 50 RPM on a Brookfield DV-III cone & plate viscometer with #52 spindle. One skilled in the art would understand that as viscosity of the organopolysiloxane increases, RPM of the viscosity test method will decrease from 50 to 0.1 RPM.

Alternatively, in the (C) organopolysiloxane, the silicon-bonded OH groups may be present in an amount of at least 50 ppm based on the weight of the (C) organopolysiloxane. Alternatively, the silicon-bonded OH groups may be present in an amount of 50 ppm to 15,000 ppm; alternatively 50 ppm to 10,000 ppm; alternatively 2,500 ppm to 7,500 ppm; and alternatively 10,000 to 15,000 ppm, on the same basis. The silicon-bonded OH content may be measured by Fourier Transform Infra-Red (FTIR) spectroscopy.

The (C) organopolysiloxane may comprise two or more different organopolysiloxanes, which may be independently selected. Typically, the (C) organopolysiloxane serves as a process aid in the composition and the polymer composite article. Without wishing to be bound by theory, the (C) organopolysiloxane may be an internal and/or external process aid. However, the (C) organopolysiloxane may serve other purposes, in addition to or alternatively to serving as a process aid, e.g. to modify physical or mechanical properties of the composition and the polymer composite article.

Generally speaking, depending on a section of the (C) organopolysiloxane, various advantages can be realized. When the composition is mixed in an extruder, for example, the (C) organopolysiloxane generally reduces a melt temperature of the composition in the extruder. The reduction in melt temperature refers to the temperature of the composition in the extruder as opposed to the melt temperature of any one individual component in the composition (and in the extruder). Importantly, this allows for processing of the composition at reduced temperatures, which provides myriad benefits, including cost and aesthetics. For example, certain fillers, such as lignocellulosic fillers, can char or degrade at certain elevated processing temperatures of the composition, typically required to make the composition flowable. Use of the (C) organopolysiloxane allows for preparing the polymer composite article at a reduced temperature without degrading. charring or otherwise deleteriously impacting the (A) filler and other aspects of the polymer composite article. Moreover, when the composition is mixed in an extruder, a torque of the extruder is generally reduced by inclusion of the (C) organopolysiloxane. Reduced torque allows for greater output, which is particularly important from the perspective of production throughput.

In certain embodiments, (i) an extrusion processing temperature reduced as compared to an extrusion processing temperature of a mixture of the (A) filler and the (B) polymer without the (C) organopolysiloxane; and/or (ii) a torque of the extruder is reduced when mixing the composition as compared to a torque of the extruder when extruding a mixture of the (A) filler and the (B) polymer without the (C) organopolysiloxane. Extrusion processing temperature is the temperature at which the composition is generally processable in the extruder, e.g. to melt the (B) polymer and other components in the composition. Extrusion processing temperature is distinguished from the melting point temperature of any one component in the composition.

The (C) organopolysiloxane may be linear, branched, partly branched, cyclic, resinous (i.e., have a three-dimensional network), or may comprise a combination of different structures. For example, the (C) organopolysiloxane may comprise any combination of M, D, T and/or Q siloxy units, so long as the (C) organopolysiloxane includes at least one silicon-bonded hydroxyl group. These siloxy units can be combined in various manners to form cyclic, linear, branched and/or resinous (three-dimensional networked) structures.

In certain embodiments, the (C) organopolysiloxane has the following average unit formula:

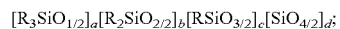

wherein each R is independently selected from OH and hydrocarbyl groups, with the proviso that in at least one molecule, at least one R is OH; $0<a\leq0.99$; $0<b\leq0.99$; $0\leq c\leq0.2$; and $0\leq d\leq0.2$, with the proviso that $a+b+c+d=1$.

Each R that is not OH may independently be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. When R is not an aryl group, R is saturated, i.e., R is free from ethylenic unsaturation.

Hydrocarbyl groups may be exemplified by methyl, ethyl, propyl, isopropyl, butyl, isobutyl, t-butyl, pentyl, hexyl, cyclohexyl, heptyl, octyl, nonyl, decyl, or similar alkyl groups; and phenyl, tolyl, xylyl, naphthyl, or similar aryl groups; benzyl, phenethyl, or similar aralkyl groups.

The silicon-bonded OH group(s) may be present in any M, D, and/or T siloxy unit present in the (C) organopolysiloxane, and may be bonded to the same silicon atom (in the case of M and/or D siloxy units). The (C) organopolysiloxane may comprise, for example, as M siloxy units: $(R_3SiO_{1/2})$, $(R_2(OH)SiO_{1/2})$, $(R(OH)_2SiO_{1/2})$, and/or $((OH)_3SiO_{1/2})$. The (C) organopolysiloxane may comprise, for example, as D siloxy units: $(R_2SiO_{2/2})$, $(R(OH)SiO_{2/2})$, and/or $((OH)_2SiO_{2/2})$. The (C) organopolysiloxane may comprise, for example, as T siloxy units: $(RSiO_{3/2})$ and/or $((OH)SiO_{3/2})$. Such siloxy units may be combined in any manner, optionally along with Q siloxy units, to give an organopolysiloxane having at least one silicon-bonded OH group.

The (C) organopolysiloxane is branched or resinous when the (C) organopolysiloxane includes T siloxy units and/or Q siloxy units. When the (C) organopolysiloxane is branched or resinous, the (C) organopolysiloxane is typically a copolymer including T siloxy units and/or Q siloxy units in combination with M siloxy units and/or D siloxy units. For example, (C) organopolysiloxane can be a DT resin, an MT resin, an MDT resin, a DTQ resin, an MTQ resin, an MDTQ resin, a DQ resin, an MQ resin, a DTQ resin, an MTQ resin, or an MDQ resin. Alternatively, in certain embodiments, the (C) organopolysiloxane is linear, in which case the (C) organopolysiloxane comprises D siloxy units in combination with M siloxy units.

In certain embodiments, the (C) organopolysiloxane has the following average unit formula:

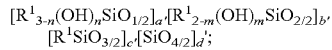

wherein each $R^1$ is an independently selected hydrocarbyl group; n is 0, 1, 2, or 3, m is 0, 1 or 2, with the proviso that n and m are not simultaneously 0; $0<a'<1$; $0<b'<1$; $0\leq c'\leq 0.1$; and $0\leq d'\leq 0.1$, with the proviso that $a'+b'+c'+d'=1$. In this average unit formula, the at least one silicon-bonded OH group is present in the M and/or D siloxy units of the (C) organopolysiloxane.

In specific embodiments, the (C) organopolysiloxane is substantially linear, alternatively linear. In these embodiments, the (C) organopolysiloxane is substantially free, alternatively free, from T siloxy and/or Q siloxy units. For example, in these specific embodiments, the (C) organopolysiloxane may have the following average unit formula:

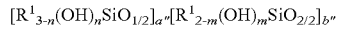

wherein each $R^1$ is an independently selected hydrocarbyl group; n is 0, 1, 2, or 3, m is 0, 1 or 2, with the proviso that n and m are not simultaneously 0; $0<a''<1$; $0<b''<1$; with the proviso that $a''+b''=1$. In certain embodiments, n is 1, 2, or 3. In these or other embodiments, m is 0 such that the silicon-bonded OH group(s) are located in the M siloxy units and thus are terminal. Given the viscosity of the (C) organopolysiloxane, as introduced above and described below, typically $b''>a''$. Each $R^1$ is typically methyl.

When the (C) organopolysiloxane is substantially linear, alternatively linear, and includes terminal silicon-bonded OH group(s), the (C) organopolysiloxane may have the following average unit formula:

wherein each $R^1$ is an independently selected hydrocarbyl group; x is 0, 1, 2, or 3, y is 0, 1, 2, or 3, with the proviso that x and y are not simultaneously 0; and c" has a value sufficient to provide the desired viscosity of the (C) organopolysiloxane, alternatively c" is from 60 to 1,200, alternatively 100 to 1,200. In certain embodiments, x is 1, 2, or 3 and y is 1, 2, or 3. Subscript c" relates to the number of repeating D units and the degree of polymerization (DP) of the (C) organopolysiloxane. As understood in the art, both the selection of $R^1$ and the DP impact viscosity of the (C) organopolysiloxane.

Regardless of the (C) organopolysiloxane utilized, the (C) organopolysiloxane has a viscosity of at least 1,000 mPa·s measured at 25° C. at RPM ranging from 0.1 to 50 on a Brookfield DV-III cone & plate viscometer with #52 spindle. For example, the (C) organopolysiloxane may have a viscosity of from 120 to 250,000, alternatively from 10,000 to 100,000, mPa·s at 25° C. tested under conditions outlined above. Typically, the (C) organopolysiloxane has a viscosity of from 1,000 to 60,000, alternatively from 1,000 to 50,000, alternatively from 2,000 to 50,000, mPa·s at 25° C. tested under the conditions outlined above.

The (C) organopolysiloxane may further comprise a carrier vehicle. The carrier vehicle may comprise an organic carrier vehicle, optionally an organic solvent, contingent on whether the (C) organopolysiloxane is merely carried by or dispersed in the carrier vehicle, or whether the (C) organopolysiloxane is solubilized in the carrier vehicle. For example, the (C) organopolysiloxane may be solubilized in the carrier vehicle, or emulsified in the carrier vehicle, e.g. when the carrier vehicle is water. Specific examples of suitable carrier vehicles include an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

Suitable carrier vehicles also include silicones, both linear and cyclic, organic oils, organic solvents and mixtures of these. For example, relative to silicones, the carrier vehicle may comprise a polydialkylsiloxane, e.g. polydimethylsiloxane. The carrier vehicle may also be a mineral filler, e.g. as the (A) filler of the composition.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm²/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

However, the (C) organopolysiloxane is typically utilized neat, i.e., in the absence of any carrier vehicle. If the (C) organopolysiloxane comprises the carrier vehicle, the viscosities referenced above are typically applicable to an organopolysiloxane of the (C) organopolysiloxane without regard to the carrier vehicle, as the carrier vehicle may reduce viscosity of the (C) organopolysiloxane. Further still, the carrier vehicle may be initially present with the (C) organopolysiloxane and driven therefrom prior to making the composition and/or polymer composite article therewith. For example, the carrier vehicle may be present when combining the components of the composition and subsequently volatilized or removed (before and/or during preparation of the polymer composite article), as described in greater detail below in connection with the inventive method.

The (C) organopolysiloxane is typically utilized in an amount of from greater than 0 to 10, alternatively from 0.25 to 9, alternatively from 0.25 to 5, alternatively from 0.5 to 5, alternatively from 0.8 to 4, alternatively from 1 to 4, alternatively from 1 to 3, wt. % based on the total weight of the composition. In a specific embodiment, the (C) organopolysiloxane is utilized in an amount of from 0.75 to 3 wt. % based on the total weight of the composition.

In a specific embodiment, the (A) filler comprises, alternatively is, a lignocellulosic filler, and the (B) polymer comprises, alternatively is, an olefin. In such embodiments, the (C) organopolysiloxane is typically utilized in an amount of from 0.5 to 3 weight percent based on the combined weight of components (A), (B), and (C).

In another specific embodiment, the (A) filler comprises, alternatively is, talc, and the (B) polymer comprises, alternatively is, an olefin. In such embodiments, the (C) organopolysiloxane is typically utilized in an amount of from 0.25 to 5, alternatively from 0.25 to 2, alternatively from 1 to 5, weight percent based on the combined weight of components (A), (B), and (C).

In another specific embodiment, the (A) filler comprises, alternatively is, calcium carbonate, and the (B) polymer comprises, alternatively is, an olefin. In such embodiments, the (C) organopolysiloxane is typically utilized in an amount of from 0.25 to 5, alternatively from 0.25 to 2, alternatively from 1 to 5, weight percent based on the combined weight of components (A), (B), and (C).

The (C) organopolysiloxane may be utilized in a neat (unadulterated) form but alternatively may be provided in any other suitable form, it may for example be provided in a diluted liquid form in combination with the aforementioned carrier vehicle or alternatively may be provided in a solid form. In certain embodiments, the (C) organopolysiloxane is a liquid at 25° C.

Alternatively, the (C) organopolysiloxane may be part of a solid carrier component. The solid carrier component is a solid at ambient temperature and pressure (e.g. 25° C. and 1 atmosphere). The solid carrier component may be formed by combining the (C) organopolysiloxane with one or more other starting materials in the composition. The solid carrier component is typically in particulate form, and may be, for example, in the form of particles, pellets, powders, etc. An average particle size of the solid carrier component is a function of desired properties thereof. In certain embodiments, the solid carrier component is a powder. In other embodiments, the solid carrier component is a pellet. Pellets typically have greater average particle sizes than powders.

In one embodiment, the solid carrier component is a combination of the (C) organopolysiloxane described above and a filler, described above. The (A) filler can be all or a portion of the filler described above as component (A). In this embodiment, the (C) organopolysiloxane may be the substantially linear, alternatively linear, organopolysiloxane described above. The (C) organopolysiloxane may have the following average unit formula (I) or (II):

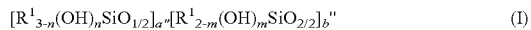

$[R^1_{3-n}(OH)_n SiO_{1/2}]_{a''}[R^1_{2-m}(OH)_m SiO_{2/2}]_{b''}$ (I)

wherein each $R^1$ is an independently selected hydrocarbyl group; n is 0, 1, 2, or 3, m is 0, 1 or 2, with the proviso that n and m are not simultaneously 0; 0<a''<1; 0<b''<1; with the proviso that a''+b''=1; or

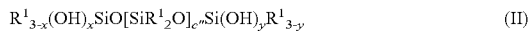

$R^1_{3-x}(OH)_x SiO[SiR^1_2 O]_{c''} Si(OH)_y R^1_{3-y}$ (II)

wherein each $R^1$ is an independently selected hydrocarbyl group; x is 0, 1, 2, or 3, y is 0, 1, 2, or 3, with the proviso that x and y are not simultaneously 0; and c'' is from 60 to 1,200. In this embodiment, the solid carrier component comprises 5% to 95% of a filler (A) and 95% to 5% of an organopolysiloxane (C) as described above. Suitable linear organopolysiloxanes for starting material (C) include a bis-hydroxyl terminated polydimethylsiloxane with a dynamic viscosity of 1,000 to 20,000 mPa·s, commercially available from Dow Silicones Corporation of Midland, Mich., USA or other hydroxyl terminated polydimethylsiloxane, e.g., with different viscosity, commercially available from Dow Silicones Corporation. The (C) organopolysiloxane and the (A) filler may be combined via any convenient means to form solid carrier components.

Alternatively, the solid carrier component may be formed by combining the (C) organopolysiloxane with all or a portion of the (B) polymer described above, such as polyethylene, before combining the solid carrier component with other components in the composition.

Alternatively, the (C) organopolysiloxane may be combined with two or more of a portion of component (A) filler, a portion of component (B) polymer, and all or a portion of component (D) to form the solid carrier component before combining the solid carrier component with other starting materials in the composition.

Alternatively, the solid carrier component may be formed by combining the (C) organopolysiloxane with a (D) compatibilizer, such as a functionalized polymer, before combining the solid carrier component with the other components of the composition. The functionalized polymer may be all or a portion of the (D) compatibilizer, such as a modified polyethylene or modified polypropylene, as described herein.

The amount of the functionalized polymer and amount of the (C) organopolysiloxane in the solid carrier component depends on various factors including the type of functionalized polymer and the molecular weight and viscosity of the (C) organopolysiloxane. However, the amount of organopolysiloxane in the solid carrier component is sufficient to provide >0 to 10%, alternatively 1% to 4%, and alternatively 1% to 3% of the (C) organopolysiloxane in the composition when the solid carrier component is combined with the other starting materials in the composition. Alternatively, the solid carrier component may comprise 70% to 95% functionalized polymer and 5% to 30% of the (C) organopolysiloxane.

In one embodiment, the solid carrier component comprises up to 40, alternatively up to 30, alternatively up to 25, alternatively up to 20, wt. % of the (C) organopolysiloxane, with the balance being the polymer described above as component (B) and/or the functionalized polymer as described above.

In an alternative embodiment, the solid carrier component may comprise the (C) organopolysiloxane, and a polymer compound such as the polymer described above as component (B) and/or the functionalized polymer as described above, and/or the (A) filler, such as that described above, or a combination of two or more of filler and polymer compound, where the relative amounts of the (C) organopolysiloxane, polymer, functionalized polymer, and the (A) filler are such that when the solid carrier component is combined with components comprising the (A) filler and the (B) polymer to make the composition for preparing the polymer composite article described herein, the resulting composition comprises:

(A) the filler in an amount of from 10 to 90 wt. %;
(B) the polymer in an amount of from 10 to 90 wt. %; and
a solid carrier component comprising the (C) organopolysiloxane and at least one other component in an amount sufficient to provide to the composition an amount of component (C) of from greater than 0 to 10 wt. %, each based on the total weight of components (A), (B) and (C) in the composition.

The solid carrier component including the (C) organopolysiloxane described above and at least one other component may be prepared by forming a mixed composition from the polymer compound (e.g., the polymer described as component (B) and/or the (D) compatibilizer, e.g. the functionalized polymer described above, and/or a combination thereof) and the (C) organopolysiloxane, described above, which may be formed by dispersing under mixing or shear, e.g., with suitable mixing equipment. Alternatively, the mixed composition may further comprise a portion of the (A) filler, as described above. For example, the mixed composition may be dispersed in a vessel equipped with an agitator and/or mixing blades. The vessel may be, for example, an internal mixer, such as a Banbury, Sigma (Z) Blade, or Cavity Transfer style mixer. Alternatively or in addition, the mixed composition may be dispersed in or processed by an extruder, which may be any extruder, e.g., a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for disperse the mixed composition described herein.

The solid carrier components prepared as described above are re-processable and may be prepared for feeding in subsequent processes. The mixed composition prepared as described above may be, for example, substantially continuous ribbons or discontinuous pellets or particles or powders. Substantially continuous ribbons can be formed by pressurizing the mixed composition and passing it through a die to create continuous strands or tapes that are subsequently cooled before being suitably packaged. Alternatively, the strand or tape may be comminuted to form pellets or powders. The mixing device may also produce the pressure needed to process the mixed composition through the die when the mixing device is an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. A conical extruder may be used for mixing and pressurizing the mixed composition. Alternately, a gear pump may be used to generate the pressure needed for extrusion after the mixed composition has been mixed. Discontinuous forms of the mixed composition may be created by chopping continuous ribbons of mixed composition into shorter lengths. Alternatively, large pieces of mixed composition may be reduced to usable sizes by use of a grinder or shredder.

In certain embodiments, the solid carrier component may be formed by a method performed continuously or semi-continuously in an extruder, such as a twin screw extruder (in which the screws are concurrently rotated, partially or fully intermeshing, alternatively counter rotated aligned either tangentially or partially or fully intermeshing). In one embodiment, the (C) organopolysiloxane is disposed in the extruder concurrently with the polymer (and optionally the (A) filler). Alternatively, the (C) organopolysiloxane may be disposed in the extruder after melting the polymer (and before adding the (A) filler, if any will be added to the mixed composition. Alternatively, the (C) organopolysiloxane may be disposed in the extruder after the (A) filler, when present, and the polymer and before the polymer mixture exits the extruder. Alternatively, the (A) filler may be disposed in the extruder concurrently with (C) organopolysiloxane, then the (B) polymer may disposed in the extruder to give a mixture and the temperature increased to a temperature suitable for compounding the mixture. The extruder may have one or more zones, such as 1 to 3, alternatively 1 to 12, alternatively 3 to 12, or alternatively 3 to 10 zones, where components can be added. The zones may be heated at different temperatures and incorporate various functional stages including conveying, melting, mixing, deaeration, vacuum, pressurization, and forming.

In specific embodiments of the method for making the solid carrier component, the (B) polymer is disposed in a first zone of the extruder, which is heated at +/−30° C. within the melting point temperature of the polymer. The (C) organopolysiloxane is disposed in a second zone of the extruder, which is heated at 10° C. to 90° C. above the melting point temperature of the polymer. The (A) filler, when present, is disposed of in either the first, second, or subsequent zones of the extruder. As noted above, the temperature utilized is typically less than a degradation temperature of the components of the composition. In certain embodiments, the mixture is stripped to remove any air, moisture or byproducts prior to pressurization and forming in the die of the extruder. The vacuum, pressurization, and forming zones may also be heated, and the temperatures utilized by the extruder, including the temperature of any zone and the die, does not exceed a degradation temperature of the polymer or (A) filler. The degradation temperature of the polymer and (A) filler is contingent on the selection thereof, as understood by one of skill in the art. The resulting extruded strand may be comminuted by any convenient means to form the solid carrier component comprising the (C) organopolysiloxane and at least one other component.

In specific embodiments, the solid carrier component comprises from 1 to 70, alternatively from 5 to 50, alternatively from 5 to 30, alternatively from 5 to 25, alternatively from 5 to 20, alternatively from 5 to 15, alternatively from 10 to 20, wt. % of the (C) organopolysiloxane based on the total weight of the solid carrier component. In these or other embodiments, the solid carrier component comprises the (B) polymer in an amount of from 0 to 90, alternatively 5 to 90, alternatively 10 to 90, alternatively 20 to 90, alternatively 30 to 90, alternatively 50 to 90, alternatively 60 to 90, alternatively 70 to 90, alternatively 5 to 60, alternatively 5 to 50, alternatively 5 to 40, wt. % based on the total weight of the solid carrier component. In these or other embodiments, the solid carrier component comprises the (D) compatibilizer in an amount of from 0 to 95, alternatively 0 to 50, alternatively 5 to 50, alternatively 5 to 30, alternatively 5 to 25, alternatively 5 to 20, alternatively 5 to 15, alternatively 10 to 20, alternatively 1 to 95, alternatively 5 to 95, alternatively 10 to 90, wt. % based on the total weight of the solid carrier component. In these or other embodiments, the solid carrier component comprises the (A) filler in an amount of from 0 to 75, alternatively from 0.5 to 5, alternatively from 0.5 to 40, alternatively from 0.5 to 25, alternatively from 0.5 to 20, alternatively from 0.5 to 15, alternatively from 0.5 to 10, alternatively from 0.5 to 5, alternatively from 0.5 to 2, alternatively from 1 to 50, alternatively from 1 to 40, alternatively from 1 to 25, alternatively from 1 to 20, alternatively from 1 to 15, alternatively from 1 to 10, alternatively from 1 to 5, alternatively form 1 to 2, wt. % based on the total weight of the solid carrier component.

In one embodiment, the solid carrier component prepared as described above comprises: 80% maleated polyethylene and (C) 20% organopolysiloxane. In an alternative embodiment, the solid carrier component prepared as described above comprises recycled polyethylene as component (B), maleated polyethylene, and the (C) organopolysiloxane described above.

In an alternative embodiment, the solid carrier component comprises a wood flour or wood fiber as component (A), maleated polyethylene as a species of compatibilizer as component (D), and the (C) organopolysiloxane described above. In this embodiment, the solid carrier component may comprise (A) 30% of a wood fiber filler, (D) 35% maleated polyethylene, and (C) 35% of the organopolysiloxane. In an alternative embodiment, the solid carrier component comprises a mixture of calcium carbonate and talc as component (A), maleated polyethylene as component (D), and the (C) organopolysiloxane described above.

In this embodiment, the solid carrier component comprises 5% to 95% of a filler and 95% to 5% of an organopolysiloxane as described above. The (C) organopolysiloxane and the (A) filler may be combined via any convenient means, such as mixing, e.g. via a ribbon blender, a pelletizing disk, a pelletizing drum, or other suitable equipment known to those of skill in the art.

Alternatively, the solid carrier component may be formed by combining the (C) organopolysiloxane with all or a portion of the (B) polymer described above, such as polyethylene, before combining the solid carrier component with other components in the composition. Alternatively, the solid carrier component may be formed by combining the (C) organopolysiloxane with (D) a functionalized polymer as the compatibilizer before combining the solid carrier component with the other components of the composition. The functionalized polymer may be all or a portion of the (D) compatibilizer, such as a modified polyethylene or modified polypropylene, as described below, Alternatively, the (C) organopolysiloxane may be combined with two or more of a portion of component (A) filler, a portion of component (B) polymer, and all or a portion of component (D) to form the solid carrier component before combining the solid carrier component with other starting materials in the composition. The components can be combined in various orders of operation and in one or more different operations.

Examples of suitable functionalized polymers for component (D) include maleic anhydride grafted high density polyethylene (MAH-g-PE). The grafted polyethylene in the MAH-g-PE may be a high density polyethylene (HDPE), a linear low density polyethylene (LLDPE), or a polyolefin elastomer. The amount of maleic anhydride constituent grafted onto the polyethylene chain is greater than 0.05 weight percent to 3 weight percent (based on the weight of the polyethylene), as determined by titration analysis, FTIR analysis, or any other appropriate method. Alternatively, this amount is 0.6 to 2.7 weight percent based on the weight of the polyethylene. In some embodiments, the amount of maleic anhydride grafted constituents is 1.0 to 2.0 weight percent based on the weight of the polyethylene. Alternatively, the amount of maleic anhydride grafted constituents is 1.0 to 1.6 weight percent, in some embodiments, based on the weight of the polyethylene. In some embodiments, the MAH-g-PE has a melt index (I2) of 0.2 g/10 minutes to 15 g/10 minutes. All individual values and subranges between 0.2 and 15 g/10 minutes are included herein and disclosed herein. For example, the MAH-g-PE can have a melt index from a lower limit of 0.2, 1, 2, 3, 4, 5, 6, 7, 8, 9, 10, or 11 g/10 minutes to an upper limit of 5, 6, 7, 8, 9, 10, 11, 12, 13, 14, or 15 g/10 minutes. The MAH-g-PE has a melt index (I2) of 2 to 15 g/10 minutes in some embodiments. The MAH-g-PE has a melt index (I2) of 5 to 15 g/10 minutes in some embodiments. In some embodiments, the MAH-g-PE has a melt index (I2) of 7 to 15 g/10 minutes.

The graft process for MAH-g-PE can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76). Alternatively, the species that is formed by the decomposition of the initiator may be an oxygen-based free radical. Alternatively, the initiator may be selected from the group consisting of carboxylic peroxyesters, peroxyketals, dialkyl peroxides, and diacyl peroxides. Exemplary initiators, commonly used to modify the structure of polymers, are listed in U.S. Pat. No. 7,897,689, in the table spanning Col. 48 line 13-Col. 49 line 29, which is hereby incorporated by reference. Alternatively, the grafting process for MAH-g-PE can be initiated by free radicals generated by thermal oxidative process.

Alternatively, in this embodiment, the solid carrier component may comprise the (C) organopolysiloxane and the functionalized polymer as the (D) compatibilizer. The functionalized polymer may be a functionalized polyolefin copolymer, which may be a graft copolymer which includes a polyolefin base and grafted residues of one or more grafting monomers. The functionalized polyolefin copolymer may be a functionalized ethylene copolymer. Alternatively, the functionalized ethylene copolymer may be a direct copolymer of ethylene with one or more functionalizing comonomers. Preferred direct copolymers include, without limitation, copolymers of ethylene with one or more functionalizing comonomers selected from the group consisting of α,β-unsaturated dicarboxylic acids, such as maleic acid, fumaric acid, itaconic acid, crotonic acid, and derivatives of the α,β-unsaturated dicarboxylic acids, such as anhydrides, monoesters and diesters, and carboxylate salts of the dicarboxylic acids and monoesters. Alternatively, the derivative may be selected from the group consisting of anhydrides, alkyl monoesters and alkyl diesters. Alternatively, the derivatives may be independently selected from esters of branched or unbranched alkyl groups comprising from 1 to 4 carbon atoms. Alternatively, the α,β-unsaturated dicarboxylic acid may be maleic acid. Alternatively, the functionalizing comonomer may be maleic anhydride. The direct copolymer may contain copolymerized residues of the functionalizing comonomer(s) in an amount of from 0.01% to 10%, alternatively 0.1% to 10%, alternatively 0.1% to 5%, and alternatively 0.3% to 3%, based on the total weight of the direct copolymer.

The direct copolymers may further comprise one or more additional comonomers selected from the group consisting of alkyl (meth)acrylates, glycidyl (meth)acrylate, ethyl acetate, and vinyl acetate. Suitable alkyl groups are branched or unbranched and comprise from 1 to 4 carbon atoms. Also preferably, the direct copolymer comprises copolymerized residues of the additional comonomer(s) in a finite amount of up to 40%, alternatively 5% to 30%, based on the total weight of the direct copolymer.

The amount of copolymerized ethylene in the direct copolymer is complementary to the amount of copolymerized functionalizing comonomer(s) and other comonomer (s), if present, so that the sum of the weight percentages of the comonomers in the direct copolymer is 100%.

The direct copolymer may have a melt flow rate (MFR) of 1 to 1000 g/10 min, alternatively from 1 to 500 g/10 min, and alternatively from 1 to 20 g/10 min, as determined in accordance with ASTM Method No. D1238-13 (version in effect in September, 2018) at 190° C. and 2.16 kg.

Specific examples of suitable direct copolymers include, without limitation, copolymers of 5% to 30% of an alkyl acrylate, 0.1% to 5% of maleic anhydride, and a complementary amount of ethylene, based on the total weight of the direct copolymer.

Suitable direct copolymers may be synthesized by random copolymerization of ethylene with the functionalizing comonomer(s) and other comonomer(s), if present, in a high-pressure free radical process, generally an autoclave process. For example, ethylene/monoalkyl maleate copolymers can be obtained using a suitable high-pressure process described U.S. Pat. No. 4,351,931. In addition, suitable direct copolymers are commercially available from from Arkema, Inc. of King of Prussia, Pa., under the tradename Lotader™ terpolymers and functional polymers such as Plexar™ from Lyondell Basell.

Suitable graft copolymers, suitable polyolefin bases, suitable grafting monomers, and suitable methods for producing the graft copolymers are described in U.S. Pat. Nos. 5,346,963; 6,545,091; and 5,053,457, for example.

Briefly, however, suitable polyolefin bases for the graft copolymer include, without limitation, polyethylene homopolymers and copolymers with alpha-olefins, copolymers of ethylene and vinyl acetate, and copolymers of ethylene and one or more alkyl (meth)acrylates. The alkyl groups may be branched or unbranched. The alkyl groups may comprise from 1 to 4 carbon atoms.

When the polyolefin base is an ethylene alkyl (meth) acrylate copolymer, it is typically synthesized in a multizone or "tubular" reactor process, as described above with respect to the preferred copolymers of ethylene and an alkyl (meth)acrylate.

When the polyolefin base is a polyethylene homopolymer or a copolymer of ethylene with one of more alpha-olefins, the polyolefin base is preferably linear or substantially linear. The term "substantially linear" as used herein with respect to the polyolefin base refers to a polymer backbone that is substituted with from 0.01 to 3 long chain branches per 1000 carbons. When the polyolefin base is a polyethylene homopolymer or a copolymer of ethylene with one of more alpha-olefins, the polyolefin base may be linear or substantially linear. The long chain branches have the same comonomer distribution as the polymer backbone, and can have the same length as the length of the polymer backbone. The length of a long chain branch is longer than the carbon length of a short chain branch, the short chain branch being formed from the incorporation of the α-olefin comonomer into the polymer backbone.

In contrast, the term "linear" as used herein with respect to the polyolefin base refers to a polymer backbone that lacks measurable or demonstrable long chain branches, i.e., it is substituted with fewer than 0.01 long chain branches per 1000 carbons.

The extent of long chain branching can be determined by using carbon-13 nuclear magnetic resonance (13C-NMR) spectroscopy and can be quantified using the method of Randall (Rev. Macromol. Chem. Phys., C29 (2 &3), 1989, p. 285-297).

The polyolefin base may have a melt flow rate (MFR) of 1 to 1000 g/10 min, alternatively 1 to 500 g/10 min, or alternatively 1 to 20 g/10 min, as determined in accordance with ASTM method D1238 (version in effect in September, 2018) at 190° C. and 2.16 kg.

Alternatively, the polyolefin base may have a density from 0.855 g/cm$^3$ to 0.960 g/cm$^3$, alternatively 0.930 g/cm$^3$ to 0.950 g/cm$^3$, as measured according to ASTM Method No. D792-91 (version in effect in September, 2018). Alternative density ranges are from 0.858 g/cm$^3$ to 0.935 g/cm$^3$, alternatively 0.860 g/cm$^3$ to 0.910 g/cm$^3$, and alternatively 0.880 g/cm$^3$ to 0.900 g/cm$^3$. Other alternative ranges may be from 0.930 g/cm$^3$ to 0.960 g/cm$^3$, when the polyolefin base is a copolymer of ethylene and an alkyl acrylate; from 0.90 g/cm$^3$ to 0.960 g/cm$^3$, when the polyolefin base is a polyethylene; and from 0.860 to 0.910 g/cm$^3$, when the polyolefin base is a plastomer, that is, a copolymer of ethylene and alpha olefins having a molecular weight between 5,000 and 50,000 Daltons as reported by the manufacturer.

Suitable grafting monomers include, without limitation, ethylenically unsaturated carboxylic acids. Preferred grafting monomers include, without limitation, acrylic acid, methacrylic acid, fumaric acid, maleic acid, nadic acid (5-norbornene-2,3-dicarboxylic acid or, more rigorously, bicyclo[2.2.1]hept-5-ene-2,3-dicarboxylic acid), citraconic acid, and itaconic acid. Also suitable are derivatives of the ethylenically unsaturated carboxylic acids, such as for example anhydrides; metal salts; esters, including monoesters and diesters; amides; imides; and the like. Alternatively, the grafting monomer may be an acid anhydride. Alternatively, grafting monomer may be selected from the group consisting of maleic acid and maleic anhydride; and alternatively maleic anhydride.

The graft copolymer may comprise a finite amount up to 10%, alternatively up to 5%, or alternatively 1% to 4%, based on the total weight of the graft copolymer, of the grafted monomer. The weight percentage of the polyolefin base is complementary to the amount of grafted monomer, so that the sum of the weight percentages of the polyolefin base and the grafted monomer in the graft copolymer is 100%.

Suitable melt flow rates for the graft copolymer are as set forth above with respect to the polyolefin base and are measured as set forth above with respect to the polyolefin base.

Polyethylene and ethylene copolymers may be synthesized and functionalized by any suitable process known in the art. For example, graft copolymers produced from polyethylene and linear and substantially linear ethylene alphaolefin copolymers may be produced as described in U.S. Pat. Nos. 5,346,963 and 6,545,091. Graft copolymers produced from copolymers of ethylene with vinyl acetate or alkyl (meth)acrylates are described in U.S. Pat. No. 5,053,457, issued to I-Hwa Lee, and references cited therein, including U.S. Pat. Nos. 4,861,677; 4,861,676; 4,670,349; 4,358,557; 3,932,332; 4,576,995; and Japanese Patent Application Nos. 59055743; 54057582 (reported as Derwent Abstract No. 46260B/25); and 58203043 (reported as Derwent Abstract No. 84-008480/02).

In specific embodiments of the method for making the solid carrier component, the (B) polymer and optionally other components, e.g. the (D) compatibilizer, if utilized, is disposed in a first zone of the extruder, which is heated at +/−30° C. within the melting point temperature of the (B) polymer. The (C) organopolysiloxane is disposed in a second zone of the extruder, which is heated at 10° C. to 90° C. above the melting point temperature of the (B) polymer. The (A) filler, when present, is disposed of in either the first, second, or subsequent zones of the extruder. As noted above, the temperature utilized is typically less than a degradation temperature of the components of the composition. In certain embodiments, the mixture is stripped to remove any air, moisture or byproducts prior to pressurization and forming in the die of the extruder. The vacuum, pressurization, and forming zones may also be heated, and the temperatures utilized by the extruder, including the temperature of any zone and the die, does not exceed a degradation temperature of the (B) polymer or (A) filler. The degradation temperature of the (B) polymer and (A) filler is contingent on the selection thereof, as understood by one of skill in the art. The resulting extruded strand may be comminuted by any convenient means to form the solid carrier component comprising the (C) organopolysiloxane and at least one other component.

In certain embodiments, in addition to components (A) filler, (B) polymer, and the (C) organopolysiloxane, the composition for preparing the polymer composite article as described above further comprises one or more additives selected from (D) a compatibilizer, (E) a colorant, (F) a blowing agent, (G) a UV stabilizer, (H) an antioxidant, (I) a process aid, (J) a preservative, (K) a biocide, (L) a flame retardant, and (M) an impact modifier. Each additive, if utilized, may be present in the composition in an amount of from greater than 0 to 30 weight percent based on the total weight of the composition. The composition may also include other optional additives, as known in the art. Such additives are described, for example, in Walker, Benjamin M., and Charles P. Rader, eds. Handbook of thermoplastic elastomers. New York: Van Nostrand Reinhold, 1979; Murphy, John, ed. Additives for plastics handbook. Elsevier, 2001; which are incorporated by reference herein. In the event the (C) organopolysiloxane is present in a solid carrier component, one or more of these additives may be included in the solid carrier component.

When selecting components for the composition for preparing the polymer composite article described above, there may be overlap between types of components because certain components described herein may have more than one function. For example, certain polysaccharides may be useful as fillers in one composite and as polymer in a different composite. Certain functional polymers may be useful as component (D). Certain particulates may be useful as fillers and as pigments, and even as flame retardants, e.g., carbon black. When selecting components for the composition, the components selected for each embodiment are distinct from one another.

As used herein, the (D) compatibilizer may be any compound or component which modifies, alternatively improves, the wetting of the (B) polymer (e.g., polyethylene) on the (A) filler. Examples of such compatibilizers include titanium alcoholates, esters of phosphoric, phosphorous, phosphonic, and silicic acids, metallic salts and esters of aliphatic, aromatic, and cycloaliphatic acids, ethylene/acrylic or methacrylic acids, ethylene/esters of acrylic or methacrylic acid, ethylene/vinyl acetate resins, styrene/maleic anhydride resins or esters thereof, acrylonitrilebutadiene styrene resins, methacrylate/butadiene styrene resins (MBS), styrene acrylonitrile resins (SAN), and butadieneacrylonitrile copolymers. Alternatively or in addition, the (D) compatibilizer may comprise a silane, e.g. a hydrocarbonoxysilane such as an alkoxysilane, a combination of an alkoxysilane and a hydroxy-functional polyorganosiloxane, an aminofunctional silane, or a combination thereof. The silane may include any functional group, which may be an adhesion-promoting group, such as amino, epoxy, mercapto and/or acrylate groups. Combinations of functional groups may be utilized, e.g. the (D) compatibilizer may comprise an epoxy-functional alkoxysilane. Suitable epoxy-functional organic groups are exemplified by 3-glycidoxypropyl and (epoxycyclohexyl)ethyl. Unsaturated organic groups are exemplified by 3-methacryloxypropyl, 3-acryloxypropyl, and unsaturated monovalent hydrocarbon groups such as vinyl, allyl, hexenyl, undecylenyl. Examples of suitable epoxy-functional alkoxysilanes include 3-glycidoxypropyltrim ethoxysilane, 3-glycidoxypropyltriethoxysilane, (epoxycyclohexyl)ethyldimethoxysilane, (epoxycyclohexyl) ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Aminofunctional silanes, such as an aminofunctional alkoxysilanes, may have various amino groups, as understood in the art.

Other examples of compatibilizers include modified polyethylene and modified polypropylene, which are obtained by modifying polyethylene and polypropylene, respectively, using a reactive group, including polar monomers such as maleic anhydride or esters, acrylic or methacrylic acid or esters, vinylacetate, acrylonitrile, and styrene. Additional specific examples of suitable (D) compatibilizers include polyethylene as described and exemplified above for component (B), but polyethylene that is grafted with a silane or maleic anhydride, such as silane grafted polyethylene or maleic anhydride grafted polyethylene or maleic anhydride grafted polypropylene. Maleic anhydride grafted polyethylene may be referred to as maleated polyethylene. Examples of suitable (D) compatibilizers are disclosed, for example, in PCT publications WO2007/071732 and WO2015/076970, and U.S. Pat. No. 8,722,773 at col. 6, the disclosures of which are incorporated by reference herein in their entireties. Alternatively, the (D) compatibilizer may comprise maleic anhydride as a discrete component, i.e., ungrafted to polyethylene. If utilized, the composition typically comprises the (D) compatibilizer in an amount of from greater than 0 to 10 weight percent based on the total weight of the composition. However, various amounts of the (D) compatibilizer may be utilized, even outside of this range, depending on its selection. For example, if the (D) compatibilizer comprises maleic anhydride grafted polyethylene, a greater amount of (D) compatibilizer and lesser amount of (B) polyethylene may be utilized in the composition due to the polyethylene present in the (D) compatibilizer in this specific embodiment.

The (E) colorant is not limited and may be, for example, a pigment, a dye, and the like. Such (E) colorants can be organic or inorganic, synthetic or natural. Non-limiting examples of suitable pigments include cadmium yellow, cadmium red, cadmium green, cadmium orange, carbon black (including vine black, lamp black), ivory black (bone char), chrome yellow, chrome green, cobalt violet, cobalt blue, cerulean blue, aureolin (cobalt yellow), Azurite, Han purple, Han blue, Egyptian blue, Malachite, Paris green, Phthalocyanine Blue BN, Phthalocyanine Green G, verdigris, viridian, sanguine, caput mortuum, oxide red, red ochre, Venetian red, Prussian blue, yellow ochre, raw sienna, burnt sienna, raw umber, burnt umber, Cremnitz white, Naples yellow, vermilion titanium yellow, titanium beige, titanium white, titanium black, ultramarine, ultramarine green shade, zinc white, zinc ferrite, alizarin (synthesized or natural), alizarin crimson (synthesized or natural), gamboge, cochineal red, rose madder, indigo, Indian yellow, Tyrian purple, quinacridone, magenta, phthalo green, phthalo blue, pigment red 170, or any combinations thereof. Such (E) colorants are typically selected and utilized based on desired aesthetics of the polymer composite article.

If utilized, the (F) blowing agent can be a physical blowing agent, a chemical blowing agent, or combination of physical and chemical blowing agents. Specific examples of physical blowing agents include various gasses and volatile liquids including, but not limited to, hydrocarbons and liquid carbon dioxide. For example, physical blowing agents include hydrocarbons having from 1 to 5, alternatively from 3 to 5, carbon atoms, including propane, butane, isobutane, or combinations thereof; hydrofluorocarbons having from 1 to 5 carbon atoms, e.g. 1,1,1,2-tetrafluoroethane or 1,1- difluoroethane; dimethyl ether; etc. Specific examples of chemical blowing agents include organic or inorganic compounds that release gas upon reaction or decomposition, e.g. upon a reaction or decomposition at a specific temperature. The (F) blowing agent may be utilized to prepare closed-cell and/or open-celled structures. The (F) blowing agent may alternatively be referred to as a foaming agent.

If utilized, the (G) UV stabilizer may be any UV stabilizer known in the art. Specific examples thereof include phenol, 2-(2H-benzotriazol-2-yl)-6-dodecyl-4-methyl-, branched and linear (TINUVIN™ 571). Additional examples of suitable (G) UV stabilizers include bis(I,2,2,6,6-pentamethyl-4-piperidyl) sebacate; methyl I,2,2,6,6-pentamethyl-4-piperidyl/sebacate; and a combination thereof (TINUVIN™ 272). These and other TINUVIN™ additives, such as TINUVIN™ 765 are commercially available from BASF. Other UV and light stabilizers are commercially available, and are exemplified by LowLite from Chemtura, OnCap from PolyOne, and Light Stabilizer 210 from E. I. du Pont de Nemours and Company of Delaware, U.S.A. An example of an oligomeric antioxidant stabilizer (specifically, hindered amine light stabilizer (HALS)) is BASF TINUVIN™ 622, which is a dimethylester of butanedioic acid copolymerized with 4-hydroxy-2,2,6,6-tetramethyl-1-piperidine ethanol.

If utilized, the (H) antioxidant may be any antioxidant known in the art. Specific examples thereof include phenolic antioxidants and combinations of phenolic antioxidants with stabilizers. Phenolic antioxidants include fully sterically hindered phenols and partially hindered phenols; and sterically hindered amines such as tetramethyl-piperidine derivatives. Suitable phenolic antioxidants include vitamin E and IRGANOX™ 1010 from BASF. IRGANOX™ 1010 comprises pentaerythritol tetrakis(3-(3,5-di-t-butyl-4-hydroxyphenyl)propionate). Additional examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *Camellia sinensis* oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (*Melaleuca aftemifolia*) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof.

If utilized, the (I) process aid is different from the (C) organopolysiloxane, although the (I) process aid may be any of the organopolysiloxanes described above for the (C) organopolysiloxane. The (I) process aid may also comprise a non-functional organopolysiloxane, e.g. polydimethylsiloxane, which may contain 0 to less than 50 ppm OH based on weight of the non-functional organopolysiloxane, alternatively a non-detectable amount of OH as measured by FTIR according to the procedure described in Elmer D. Lipp *Appl. Spectrosc.* 1991, 45, 477. The (I) process aid may be an internal process aid, an external process aid, or a combination thereof. The (I) process aid may be a solid, e.g. a powdered solid, a liquid, such as an oil, etc. Specific examples of (I) process aids include ethylene bis-stearamide (EBS), hydrocarbon waxes, fatty acids and esters thereof, chlorinated paraffin waxes, metal stearates, etc. The (C) organopolysiloxane may be combined with the (I) process aid, if the (I) process aid is utilized, such that the (C) organopolysiloxane and the (I) process aid are utilized in concert. If combined, the (I) process aid may also serve as a carrier vehicle for the (C) organopolysiloxane, depending upon a selection of each and the relative amounts thereof.

Examples of (J) preservatives include paraben derivatives, hydantoin derivatives, chlorhexidine and its derivatives, imidazolidinyl urea, phenoxyethanol, silver derivatives, salicylate derivatives, triclosan, ciclopirox olamine, hexamidine, oxyquinoline and its derivatives, PVP-iodine, zinc salts and derivatives such as zinc pyrithione, and mixtures thereof.

The (K) biocide may be exemplified by (K1) a fungicide, (K2) an herbicide, (K3) a pesticide, (K4) an antimicrobial agent, or a combination thereof.

Specific examples of (K1) fungicides include N-substituted benzimidazole carbamate, benzimidazolyl carbamate such as methyl 2-benzimidazolylcarbamate, ethyl 2-benzimidazolylcarbamate, isopropyl 2-benzimidazolylcarbamate, methyl N-{2-[I-(N,N-dimethylcarbamoyl)benzimidazolyl]}carbamate, methyl N-{2-[I-(N,N-dimethylcarbamoyl)-6-methylbenzimidazolyl]}carbamate, methyl N-{2-[I-(N,N-dimethylcarbamoyl)-5-methylbenzimidazolyl]}carbamate, methyl N-{2-[I-(N-methylcarbamoyl)benzimidazolyl]}carbamate, methyl N-{2-[I-(N-methylcarbamoyl)-6-methylbenzimidazolyl]}carbamate, methyl N-{2-[I-(N-methylcarbamoyl)-5-methylbenzimidazolyl]}carbamate, ethyl N-{2-[I-(N,N-dimethylcarbamoyl)benzimidazolyl]}carbamate, ethyl N-{2-[2-(N-methylcarbamoyl)benzimidazolyl]}carbamate, ethyl N-{2-[I-(N,N-dimethylcarbamoyl)-6-methylbenzimidazolyl]}carbamate, ethyl N-{2-[I-(N-methylcarbamoyl)-6-methylbenzimidazolyl]}carbamate, isopropyl N-{2-[I-(N,N-dimethylcarbamoyl)benzimidazolyl]}carbamate, isopropyl N-{2-[I-(N-methylcarbamoyl)benzimidazolyl]}carbamate, methyl N-{2-[I-(N-prop ylcarbamoyl)benzimidazolyl]}carbamate, methyl N-{2-[I-(N-butylcarbamoyl)benzimidazolyl]}carbamate, methoxyethyl N-{2-[I-(N-prop ylcarbamoyl)benzimidazolyl]}carbamate, methoxyethyl N-{2-[I-(N-butylcarbamoyl)benzimidazolyl]}carbamate, ethoxyethyl N-{2-[I-(N-prop ylcarbamoyl)benzimidazolyl]}carbamate, ethoxyethyl N-{2-[I-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[I-(N-butylcarbamoyloxy)benzoimidazolyl]}carbamate, ethoxyethyl N-{2-[I-(N-prop ylcarbamoyl)benzimidazolyl]}carbamate, ethoxyethyl N-{2-[I-(N-butylcarbamoyloxy)

benzoimidazolyl]}carbamate, methyl N-{2-[I-(N,N-dimethylcarbamoyl)-6-chlorobenzimidazolyl]}carbamate, and methyl N-{2-[I-(N,N-dimethylcarbamoyl)-6-nitrobenzidazolyl]}carbamate; 10,10'-oxybisphenoxarsine (which has trade name Vinyzene, OB PA), di-iodomethyl-para-tolylsulfone, benzothiophene-2-cyclohexylcarboxamide-S,S-dioxide, N-(fluordichloridemethylthio)phthalimide (which has trade names Fluor-Folper, and Preventol A3); methyl-benzimideazol-2-ylcarbamate (which has trade names Carbendazim, and Preventol BCM), zinc-bis (2-pyridylthio-I-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or triazolyl-compounds, such as tebuconazol in combination with zeolites containing silver.

Specific examples of (K2) herbicides include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxyjacetanilide; naproanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxymethyl-2-chloro-2',6'-diethylacetanilide; metazachlor 2-chloro-N-(pyrazol-1-ylmethyl)acet-2',6'-xylidide; prynachlor (RS)-2-chloro-N-(1-methylprop-2-ynyl) acetanilide; sulphonanilide herbicides such as cloransulam 3-chloro-2-(5-ethoxy-7-fluoro[1,2,4]triazolo[1,5-a]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio)benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-ie/t-butyl-I,2-oxazol-3-ylcarbamate; fenasulam methyl 4-[2-(4-chloro-otolyloxy)acetamido] phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(I-ethoxyiminopropyl)-3-hydroxycyclohex-2-en-1-one; tepraloxydim (RS)-(EZ)-2-{I-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2-mesylphenyl 5-cyclopropyl-I,2-oxazol-4-yl ketone; dicarboximide herbicides such as flumezin 2-methyl-4-(α,α,α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen a-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet3,5-dimethyl-I,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl)nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-diiodobenzonitrile; organophosphorus herbicides such as anilofos S-4-chloro-N-isopropylcarbaniloylmethyl 0,0-dimethyl phosphorodithioate; glufosinate 4-[hydroxy(methyl)phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy)ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy) propionic acid; aryloxyphenoxypropionic herbicides such as isoxapyrifop $(R,S')$-2-[2-[4-(3,5-dichloro-2-pyridyloxy)phenoxy]propionyl]isoxazolidine; phenylenediamine herbicides such as dinitramine $N^I,N^I$-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy] acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluroxypyr 4-amino-3,5-dichloro-6-fluoro-2-pyridyloxyacetic acid; thiazopyr methyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-$N^4$-isopropylpyrimidine-2; 4-diamine; quaternary ammonium herbicides such as diethamquat 1,1'-bis(diethylcarbamoylmethyl)-4,4'-bipyridinium; paraquat I, -dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis(thioformate); thiourea herbicides such as methiuron I,I-dimethyl-3-m-tolyl-2-thiourea; triazine herbicides such as triaziflam (R5')-N-[2-(3,5-dimethylphenoxy)-1-methylethyl]-6-(1-fluoro-1-methylethyl)-I,3,5-triazine-2,4-diamine; chlorotriazine herbicides such as cyprazine 6-chloro-$N^2$-cyclopropyl-$N^4$-isopropyl-1-3,5-triazine-2,4-diamine; propazine 6-chloro-$N^2,N^4$-diisopropyl-I,3,5-triazine-2,4-diamine; methoxytriazine herbicides such as prometon $N^2,N^4$-di-isopropyl-6-methoxy-I,3,5-triazine-2, 4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-I,3,5-triazine-2,4(IH,3H)-dione; triazole herbicides such as epronaz N-ethyl-N-propyl-3-propylsulphonyl-IH-I,2,4-triazole-1-carboxamide; triazolone herbicides such as carfentrazone (RS)-2-chloro-3-{2-chloro-5-[4-(difluoromethyl)-4,5-dihydro-3-methyl-5-oxo-IH-I,2,4-triazol-1-yl]-4-fluorophenyl}propionic acid; triazolopyrimidine herbicides such as florasulam 2',6',8-trifluoro-5-methoxy[I,2,4]triazolo[I,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrimidin-I-yl)benzoate; urea herbicides such as cycluron 3-cyclo-octyl-I,I-dimethylurea; monisouron I-(5-ieri-butyl-1,2-oxazol-3-yl)-3-methylurea; phenylurea herbicides such as chloroxuron 3-[4-(4-chlorophenoxy)phenyl]-I,I-dimethylurea; siduron I-(2-methylcyclohexyl)-3-phenylurea; pyrimidinylsulphonylurea herbicides such as flazasulphuron I-(4,6-dimethoxypyrimidin-2-yl)-3-(3-trifluoromethyl-2-pyridylsulphonyl)urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-I,3,5-triazin-2-ylcarbamoylsulphamoyl)thiophene-2-carboxylic acid; thiadiazolylurea herbicides such as tebuthiuron I-(5-tert-butyl-I,3,4-thiadiazol-2-yl)-I,3-dimethylurea; and/or unclassified herbicides such as chlorfenac (2,3,6-trichlorophenyl)acetic acid; methazole 2-(3,4-dichlorophenyl)-4-methyl-I,2,4-oxadiazolidine-3,5-dione; tritac (RS)-I-(2,3,6-trichlorobenzyloxy)propan-2-ol; 2,4-D, chlorimuron, and fenoxaprop; and combinations thereof.

Specific examples of (K3) pesticides include atrazine, diazinon, and chlorpyrifos. The (K3) pesticide includes insect repellents such as N,N-diethyl-meta-toluamide and pyrethroids such as pyrethrin.

Suitable (K4) antimicrobial agents are commercially available, such as BIOSIL™ 5700 Antimicrobial and BIOSIL™ 5772 Antimicrobial, which are commercially available from Dow Silicones Corporation of Midland, Mich., U.S.A.

Alternatively, the (K) biocide may comprise a boron containing material, e.g., boric anhydride, borax, or disodium octaborate tetrahydrate; which may function as a pesticide, fungicide, and/or flame retardant.

Specific examples of suitable (L) flame retardants include carbon black, hydrated aluminum hydroxide, magnesium hydroxide, hydromagnesite and silicates such as wollastonite, platinum and platinum compounds. Alternatively, the (L) flame retardant, if utilized, may be selected from halogen based flame-retardants such as decabromodiphenyloxide, octabromodiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy) ethane, bis-(pentabromophenoxy) ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene and PVC. Alternatively, the (L) flame retardant, if utilized, may be selected from phosphorus based flame-retardants such as (2,3-dibromopropyl)-phosphate, phosphorus, cyclic phosphates, triaryl phosphate, bis-melaminium pentate, pentaerythritol bicyclic phosphate, dimethyl methyl phosphate, phosphine oxide diol, triphenyl phosphate, tris-(2-chloroethyl) phosphate, phosphate esters such as tricreyl, trixylenyl, isodecyl diphenyl, ethylhexyl diphenyl, phosphate salts of various amines such as ammonium phosphate, trioctyl, tributyl or tris-butoxyethyl phosphate ester. Other suitable (L) flame retardants may include tetraalkyl lead compounds such as tetraethyl lead, iron pentacarbonyl, manganese methyl cyclopentadienyl tricarbonyl, melamine and derivatives such as melamine salts, guanidine, dicyandiamide, ammonium sulphamate, alumina trihydrate, and magnesium hydroxide alumina trihydrate.

Specific examples of suitable (M) impact modifiers include acrylonitrile butadiene styrene (ABS), acrylonitrile styrene acrylate (ASA), methacrylate butadiene styrene (MBS), poly(styrene-butadiene-styrene) (SBS), styrene ethylene butylene styrene (SEBS), poly(styrene-isoprene-styrene) (SIS), maleic anhydride-modified SEBS, acrylic, polyacrylate, chlorinated polyethylene elastomer (CPE), ethylene propylene diene monomer, maleic anhydride-modified EPDM, styrene acrylonitrile-modified EPDM, DMA modified ethylene-acrylate copolymers, ionomers, thermoplastic elastomers and plastomers, modified polyolefins (reactive and/or nonreactive), silicone rubber (e.g. alkyl and/or aryl silicone rubber),and combinations thereof.

A method for preparing a polymer composite article is also provided. The method comprises preparing the polymer composite article from the composition. In certain embodiments, the method further comprises forming the composition. The composition is formed by combining at least component the (A) filler, the (B) polymer, and the (C) organopolysiloxane, along with any optional components present in the composition. When the (C) organopolysiloxane is in the form of a solid carrier component, the method comprises combining the (A) filler, the (B) polymer, and the solid carrier component comprising the (C) organopolysiloxane.

The components of the composition may be combined in any order and via any suitable manner. In certain embodiments, for example, when a thermoplastic is used as the (B) polymer, the (B) polymer may be melted prior to, during, and/or after formation of the composition. For example, the (B) polymer may be heated prior to and/or during combining the components such that the (A) filler and the (C) organopolysiloxane are combined with a melted form of the (B) polymer. The (A) filler and the (C) organopolysiloxane may be combined with the melted form of the (B) polymer in any order, e.g. individually, sequentially, together, or simultaneously. Alternatively, however, the (B) polymer may be combined with the (A) filler and the (C) organopolysiloxane prior to heating or melting the (B) polymer such that the (B) polymer is in solid and unmelted or unsoftened form when preparing the composition. Alternatively, the (A) filler and the (C) organopolysiloxane may be combined and heated, then added to the (B) polymer in solid or liquid form when preparing the composition.

A melting point temperature (or glass transition temperature) of the (B) polymer is typically a function of the (B) polymer utilized. For example, in the case of polyethylene, high-density polyethylene may have a higher melting point temperature than low-density polyethylene. Further, certain species of polymers have different melting point temperatures than other species of polymers. In certain embodiments, the (B) polymer is heated before, during, and/or after formation of the composition to a temperature that is greater than the melting point temperature of the (B) polymer, e.g. 10 to 90, alternatively 10 to 40, ° C. higher than the melting point temperature of the (B) polymer. This ensures melting rather than mere softening of the (B) polymer. Alternatively, lower temperatures may be utilized in combination with shear or mixing to ensure softening and/or melting of the (B) polymer.

The (C) organopolysiloxane may be in liquid form or delivered in the form of a pelletized masterbatch, i.e., a solid which is a combination of the (C) organopolysiloxane and one or more other polymeric components. For example, the (B) polymer and the (C) organopolysiloxane may be combined to give a masterbatch, which is subsequently combined with the (A) filler to give the composition. Alternatively, however, more than one masterbatch may be formed, e.g., one masterbatch with a portion of the (B) polymer and the (A) filler, and an additional masterbatch (with a portion of the (B) polymer and the (C) organopolysiloxane may be prepared and combined to give the composition. Alternatively, the solid carrier component may comprise, alternatively consist essentially of, or alternatively consist of, the (A) filler and the (C) organopolysiloxane.

In certain embodiments, the (A) filler and the (C) organopolysiloxane and at least one other component (e.g., one or more of the additional components described above) may be combined to give a mixture, and the mixture is combined with the (B) polymer (and any other additional components) to give the composition. Combining the (A) filler and the (C) organopolysiloxane may be referred to as surface treating, wetting, or pre-treating the (A) filler, which may be further to or alternatively to surface treating the (A) filler as set forth above. Alternatively, the (A) filler and the (C) organopolysiloxane may be combined by spraying, impregnation, blending or mixing. Combining the (A) filler and the (C) organopolysiloxane may further comprise heating, e.g., to bind the (C) organopolysiloxane to the (A) filler. Optionally, the resulting combination of (A) filler and (C) organopolysiloxane may be compacted before being pelletized to form the pellet if a pellet is utilized. Combining the (A) filler and the (C) organopolysiloxane may be performed in a separate process or may be integrated into an existing (e.g., extrusion) process for making a polymer composite article in a pre-mixing step. In the pre-mixing step, the components may be blended together before feeding into an extruder, e.g., all or a portion of the (A) filler and the (C) organopolysiloxane (prepared as described above) and (B) the polymer, and one or more additional components, may be mixed in the pre-mixing step and thereafter fed to an extruder.

The (C) organopolysiloxane may be combined with the (A) filler while disposed or combined with the carrier vehicle or in neat form. For example, the (C) organopolysiloxane in the carrier vehicle may be combined with the (A) filler, and the carrier vehicle may optionally be driven therefrom prior to adding the (A) filler and the (C) organopolysiloxane to the composition such that carrier vehicle is present in an initial mixture, e.g. the solid carrier component, but not in the composition. Alternatively, all or a portion of the carrier vehicle may be present in and driven from the composition when preparing the polymer composite article therewith. In addition, or alternatively still, the (A) filler may be treated with a surface treatment agent other than the (C) organopolysiloxane, in situ and/or prior to incorporation in the solid carrier component.

In certain embodiments in which the (C) organopolysiloxane is present in the solid carrier component, the solid carrier component comprising the (A) filler and the (C) organopolysiloxane, the solid carrier component can be heated. In certain embodiments the solid carrier component is heated in a vacuum. This can be performed for multiple reasons, such as to promote reaction between the components for surface treatment, to evaporate the carrier vehicle, to evaporate other components present in the mixture used to form the solid carrier component of the (A) filler and the (C) organopolysiloxane or to improve the mechanical properties of the solid carrier component before using in the process.

The composition for preparing the polymer composite article may be formed under mixing or shear, e.g. with suitable mixing equipment. For example, the composition may be formed in a vessel equipped with an agitator and/or mixing blades. The vessel may be, for example, an internal mixer, such as a Banbury, Sigma (Z) Blade, or Cavity Transfer style mixer. Alternatively or in addition, the composition may be formed in or processed by an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the composition described herein.

As introduced above, the method also comprises preparing the polymer composite article from the composition for preparing the polymer composite article. The composition may be formed, e.g. in the vessel, and subsequently removed from the vessel to form the polymer composite article with separate equipment. Alternatively, the same equipment may be utilized to prepare the composition and subsequently form the polymer composite article. For example, the composition may be prepared and/or mixed in an extruder, and the extruder may be utilized to prepare the polymer composite article with the composition. Alternatively, the polymer composite article may be formed via molding, e.g. with an injection or transfer molding process. The composition may be formed in situ in the mold, or formed independently and disposed in the mold once formed. Alternatively still, the polymeric composite article may be a film. In such embodiments, the composition can be formed or disposed in a vessel, optionally under mixing at an elevated temperature, and disposed in or on equipment to prepare the film from the composition. Such equipment and techniques for preparing films from compositions, particularly those including thermoplastics like the (B) polymer of the composition, are well known in the art.

In certain embodiments, preparing the polymer composite article from the composition further comprises forming the composition into a desired shape. The desired shape depends on end use applications of the polymer composite article. One of skill in the art understands how dies for extrusion and molds for molding may be selected and created based on the desired shape of the polymer composite article.

In certain embodiments, the method is performed continuously or semi-continuously in an extruder, such as a twin screw extruder (in which the screws are concurrently rotated, partially or fully intermeshing, alternatively counter rotated aligned either tangentially or partially or fully intermeshing). In one embodiment, the (C) organopolysiloxane is disposed in the extruder concurrently with the (A) filler and the (B) polymer. Alternatively, the (C) organopolysiloxane may be disposed in the extruder after melting the (B) polymer and before adding the (A) filler. Alternatively, the (C) organopolysiloxane may be disposed in the extruder after the (A) filler and the (B) polymer and before the polymer composite article exits the extruder. Alternatively, the (A) filler may be disposed in the extruder concurrently with the (C) organopolysiloxane, where they are heated to effect surface treatment of the (A) filler with the (C) organopolysiloxane, then the (B) polymer is disposed in the extruder to give a mixture and the temperature increased to a temperature suitable for compounding the mixture and forming the polymer composite article. The extruder may have one or more zones, such as 1 to 3, or 3 to 8, or 1 to 12, zones, where starting materials can be added. The zones may be heated at different temperatures.

In specific embodiments, the (B) polymer is disposed in a first zone of the extruder, which is heated at +/−30° C. within the melting point temperature of the (B) polymer. The (C) organopolysiloxane is disposed in a second zone of the extruder, which is heated at 10° C. to 90° C. above the melting point temperature of the (B) polymer. As noted above, the temperature utilized is typically less than a degradation temperature of the components of the composition. In certain embodiments, a die of the extruder may also be heated, and the temperatures utilized by the extruder, including the temperature of any zone and the die, does not exceed a degradation temperature of the (A) filler. The degradation temperature of the (A) filler is contingent on the selection thereof, as understood by one of skill in the art.

In certain embodiments, depending on a selection of the (B) polymer, the method prepares an uncured or unvulcanized polymer composite article, and the method further comprises curing and/or vulcanizing the uncured or unvulcanized polymer composite article to give the polymer composite article. Curing or vulcanizing the uncured or unvulcanized polymer composite article generally maintains shape and dimension of the polymer composite article. Typically, in such embodiments, curing and/or vulcanizing is carried out at an elevated temperature that is higher than the processing or compounding temperature utilizing to form the uncured or unvulcanized polymer composite article. Curing or vulcanizing is typically carried out when the (B) polymer comprises the elastomer.

The polymer composite article of the invention is not limited and may be customized for myriad end use applications and industries. By way of example only, the polymer composite article may be utilized in or as tubing; piping; hosing; an insulating (e.g. thermally and/or electrically insulating) article; a conductive (e.g. thermally and/or electrically conductive) article; automotive components or applications, including under hood components and parts and interior components, e.g. floor mats; consumer products and applications, industrial or commercial products and applications, aerospace products and applications, transportation products and applications, aircraft products and applications, electronics products and applications, residential or commercial building and construction products and applications, e.g. decking, railing, siding, fencing, window framing, flooring, etc.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

INDUSTRIAL APPLICABILITY

Without wishing to be bound by theory, it is thought that the (C) organopolysiloxane may provide one or more benefits to the polymer composites and/or processes for making them described herein. These include:

Lower torque during compounding;

Increased compounding through put and or lower energy consumption;

Better filler dispersion and reduced glass fiber breakup (if glass fibers are used) during compounding and molding;

Ability to mold thinner walls;

Ability to include high filler loadings;

Less reject rates during demolding;

Better surface quality; and/or

Improved hydrophobicity.

Increased selection of other components, such as (D) compatibilizers

Ability to utilize a larger proportion of recycled polymers or different grades

Increased selection of fillers

Enabling additives that improve strength and other properties

Using the solid carrier component, which is a solid at 25° C. and 1 atmosphere to deliver the solid carrier component may solve the problem of delivery of the (C) organopolysiloxane into the composition and polymer composite article prepared therewith. Using a solid carrier component instead of a liquid polyorganosiloxane may provide the benefit of using a liquid organopolysiloxane in conventional solids handling equipment, such as extruders.

EXAMPLES

Reference Example 1—General Procedure for Preparation of a Pelletized Organopolysiloxane Including a Liquid Organopolysiloxane and Filler (Prophetic)

To a pelletizing drum or disk, is added a powder filler such as wood flour to the rotating drum. Fine droplets of an organopolysiloxane liquid such as and a bis-hydroxyl terminated polydimethylsiloxane with dynamic viscosity of 13,500 mPa·s (OH PDMS) or alternative from Dow Silicones Corporation of Midland, Mich., USA is slowly sprayed onto the powder in the rotating drum. As the powder falls, it will be coated by liquid and stick together. During this process an agglomerate will form and grow, creating small pellets of filler and siloxane.

Example 2—Preparation of Organosiloxane/Filler Pellet

Fumed silica was mixed with OH PDMS. Using a stainless pan, 25.2 grams of fumed silica was manually mixed with 47.3 grams of OH PDMS, resulting in a free flowing powder. This can then be used as a source of OH PDMS by the customer.

Example 3 Preparation of Organosiloxane/Filler Pellet

Using a stainless pan, 97.0 grams of wood flour was manually mixed with 45.6 grams of OH PDMS, resulting in a free flowing powder. This can then be used as a source of the (C) organopolysiloxane by the customer.

Example 4—Preparation of Organosiloxane/Filler Pellet (Prophetic)

Talc or calcium carbonate was added to a mixer. An organopolysiloxane, such as OH PDMS is slowly blended into the powder until it becomes sticky, then more of the filler is added until it is a free flowing powder.

Example 5-8—Preparation of Organopolysiloxane/Maleated Polyethylene (MAPE) Pellet Maleic anhydride grafted high density polyethylene (D), with a density of 0.96 g/cm$^3$ as measured by ASTM D792 and hydroxyl terminated organopolysiloxane (C) are used in this example.

Compounding was conducted on a twin screw extruder. MAPE was fed at barrel zone via gravimetric feeder. OH PDMS was fed through an open port into a convey section of the screw after the feeder.

Torque value for different compositions are listed below:

TABLE 1

Torque Values in the TSE with different compositions of MAPE (D) and hydroxyl terminated organopolysiloxane (C).

| Example | D (Wt. %) | C (Wt. %) | Torque % |
|---|---|---|---|
|  | 100 | 0 | 84 |
| 5 | 95 | 5 | 79 |
| 6 | 90 | 10 | 68.5 |
| 7 | 85 | 15 | 56.5 |
| 8 | 80 | 20 | 48.5 |

These examples shows that pellets with varying concentrations of MAPE (D) and polyorganosiloxane (C) can be used to make a pellet. These examples show that under the conditions tested, 10% to 20% of the OH PDMS and 20% to 90% MAPE can be conveniently incorporated in a pellet. Without wishing to be bound by theory, it may be possible to incorporate higher amounts of organopolysiloxane into a pellet using a different organopolysiloxane, maleated polyethylene, or both.

Examples 9-38 and Comparative Examples 1-4

Table 2 below shows the type and amounts of components utilized to prepare Examples 9-38 and Comparative Examples 1-4.

TABLE 2

| Example | A | A (wt %) | B | C | C (wt %) | D | D (wt %) | C Format | Method of Prep |
|---|---|---|---|---|---|---|---|---|---|
| 9 | 2 | 55 | 1 | 4 | 2 | 1 | 1.5 | Liquid | 1 |
| 10 | 2 | 55 | 1 | 4 | 2 | None | 0 | Liquid | 1 |
| 11 | 4 | 55 | 1 | 2 | 2 | 1 | 2 | Pellet | 2 |
| 12 | 4 | 55 | 1 | 4 | 2 | 1 | 2 | Pellet | 2 |
| 13 | 4 | 55 | 1 | 2 | 2 | None | 0 | Pellet | 2 |
| 14 | 4 | 55 | 1 | 4 | 1 | None | 0 | Pellet | 2 |
| 15 | 4 | 55 | 1 | 4 | 2 | None | 0 | Pellet | 2 |
| 16 | 5B | 55 | 1 | 2 | 1 | 2 | 1 | Liquid | 1 |
| 17 | 5B | 55 | 1 | 2 | 2 | 2 | 1 | Liquid | 1 |
| 18 | 5B | 55 | 1 | 2 | 4 | 2 | 1 | Liquid | 1 |
| 19 | 5A | 55 | 1 | 3 | 1.5 | 2 | 1.5 | Liquid | 1 |
| 20 | 5A | 55 | 1 | 6 | 1.5 | 2 | 1.5 | Liquid | 1 |
| 21 | 5B | 55 | 1 | 3 | 4 | 2 | 1 | Liquid | 1 |
| 22 | 5B | 55 | 1 | 3 | 2 | 2 | 1 | Liquid | 1 |
| 23 | 5B | 55 | 1 | 3 | 1 | 2 | 1 | Liquid | 1 |
| 24 | 5A | 55 | 1 | 4 | 1 | 2 | 1.5 | Liquid | 1 |
| 25 | 5A | 55 | 1 | 4 | 1.5 | 2 | 1.5 | Pellet | 1 |
| 26 | 5A | 55 | 1 | 4 | 1.5 | 2 | 1.5 | Liquid | 1 |
| 27 | 5A | 55 | 1 | 4 | 2 | 2 | 1.5 | Liquid | 1 |
| 28 | 5A | 55 | 1 | 4 | 4 | 2 | 1.5 | Liquid | 1 |
| 29 | 5A | 55 | 1 | 5 | 1.5 | 2 | 1.5 | Liquid | 1 |
| 30 | 5B | 55 | 1 | 7 | 2 | 2 | 1 | Liquid | 1 |
| 31 | 5A | 55 | 1 | 8 | 1.5 | 2 | 1.5 | Liquid | 1 |
| 32 | 5B | 55 | 1 | 2 | 2 | None | 0 | Liquid | 1 |
| 33 | 5B | 55 | 1 | 3 | 2 | None | 0 | Liquid | 1 |
| 34 | 5B | 55 | 1 | 3 | 1 | None | 0 | Liquid | 1 |
| 35 | 5A | 55 | 1 | 4 | 4 | None | 0 | Liquid | 1 |
| 36 | 5A | 55 | 1 | 4 | 2 | None | 0 | Liquid | 1 |
| 37 | 5B | 55 | 1 | 4 | 2 | None | 0 | Liquid | 1 |
| 38 | 5A | 55 | 1 | 4 | 1 | None | 0 | Liquid | 1 |
| C. E. 1 | 5A | 55 | 1 | 1 | 1 | 2 | 1.5 | Liquid | 1 |
| C.E. 2 | 5A | 55 | 1 | 1 | 2 | 2 | 1.5 | Liquid | 1 |
| C.E. 3 | 5A | 55 | 1 | 1 | 1 | None | 0 | Liquid | 1 |
| C.E. 4 | 5A | 55 | 1 | 1 | 2 | None | 0 | Liquid | 1 |

The (B) polymer 1 is high density polyethylene, having a melt flow rate (MFR) of 0.8 g/10 min as measured in accordance with ASTM D-1238 190° C./2.16 kg), and a density of 0.96 g/cm$^3$ as measured in accordance with ASTM D792.

The (A) filler 1 is a calcium carbonate, untreated, having an average particle size of 3 micron.

The (A) filler 2 is calcium carbonate, stearic acid treated, having an average particle size of 3 micron.

The (A) filler 3 is a calcium carbonate, untreated, having an average particle size of 12 micron The (A) filler 4 is talc, untreated, having an average particle size of 1.9 micron.

The (A) filler 5 is wood flour, 60 mesh, in two lots: 5A and 5B

The wood flour (5A) and (5B) was composed of primarily hardwoods such as maple and oak. The hydroscopic nature of wood results in moisture contents of up to 10% despite being dried at the time of milling. To compensate for these variations, the wood content was adjusted in the final formulation for moisture content to result in consistent levels of dried wood for all samples. Moisture was removed from the wood by use of a vacuum vent on the extruder shortly after the introduction of the wood to the polymer system. Using this system the water was removed for uniformly dry pellets at the time of processing. The wood flour consisted of the following particle size distribution:

850 Microns: 0-1%
425 Microns: 15-35%
250 Microns: 30-60%
180 Microns: 10-25%
150 Microns: 0-15%
Balance Pan 0-23%

The (C) organopolysiloxane 1 is hydroxy terminated siloxane with a viscosity of 100 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 2 is hydroxy terminated siloxane with a viscosity of 2,000 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 3 is hydroxy terminated siloxane with a viscosity of 6,000 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 4 is hydroxy terminated siloxane with a viscosity of 13,500 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 5 is hydroxy terminated siloxane with a viscosity of 20,000 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 6 is hydroxy terminated siloxane with a viscosity of 16,500 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 7 is hydroxy terminated siloxane with a viscosity of 50,000 cSt as measured by an Anton Paar MCR 301 Rheometer equipped with a 50 mm Cone and Plate with a 0.5° cone at 25° C. under steady shear and a shear rate 1 s$^{-1}$.

The (C) organopolysiloxane 8 is siloxane with a viscosity of 12,000 cSt with a combination of hydroxy and trimethyl end blocks as measured by an Anton Paar MCR 301 Rheometer equipped with a 50 mm Cone and Plate with a 0.5° cone at 25° C. under steady shear and a shear rate 1 s$^{-1}$.

The format of the (C) organopolysiloxane was either as a pellet or a liquid. The liquid format was provided by directly forcing the liquid into the extruder at the zone after the feed throat. Examples where the format was a pellet were provided by combining the (C) organopolysiloxane with the (B) polymer at one of two ratios. For examples 11-15, the (C) organopolysiloxane was combined with the (C) polymer at a ratio of 1:9. For the example 25, the (C) organopolysiloxane was combined with the (B) polymer and the (D) compatibilizer to form a single pellet. This was provided at a ratio of 1 part of the (C) organopolysiloxane to 1 part of the (D) compatibilizer to 3 parts of the (B) polymer. The pellet examples were then blended with any additional amount of the (B) polymer to obtain the desired weight percent.

The (D) compatibilizer 1 is a maleic anhydride comonomer grafted with a high density polyethylene The (D) compatibilizer 2 is a random ethylene copolymer which is classified as being a maleic anhydride equivalent Weight percent of A was determined as the balance necessary for 100% after all other materials were added to each formulation.

Compositions for these Examples were produced using two methods, both with twin screw extruders. In the case of method 1, the composition was processed in the twin screw extruder and into a granular format by chopping extruded strands. The granular pellets could then be used in subsequent processes.

Compositions in method 2 were processed with a similar twin screw compounding extruder. This method 2 was different from method 1 in that the melted material was pushed immediately into an injection molding system such that the composition could be directly formed into tensile bars without producing a pellet or experiencing a second heat history for purposes of expedience.

For both method 1 and method 2, the (A) fillers were added independent of the (B) polymers and process aids through a secondary feed system located at a downstream position on the extruder barrel. By mixing of the solids into the fully melted polymer and process aid blend, higher filler content samples could be produced than would have been possible with all materials being fed at the same location.

Injection molding was utilized for producing test specimens. Tensile bars were produced and tested in accordance with ASTM D638-14. Each composition was processed with the same conditions for both compounding in the twin screw extruder and injection molding equipment for consistency. For each example, total feed rates, RPM, temperatures, and equipment configurations remained constant for each composition for both the compounding extruders and injection molding equipment.

The parameters associated with extrusion, as well as the average break strength of the polymer composite article formed by each Example, the strand quality, and color of the final injection molded tensile bars is set forth below in Table 3.

TABLE 3

| Example | Extruder Torque (%) | Melt Temperature (° C.) | Avg. Break Strength (MPa) | Strand Quality | Color (Y) |
|---|---|---|---|---|---|
| 9 | 43 | 205 | 27.2 | | |
| 10 | 38 | 202 | 17.2 | | |
| 11 | 63 | 280 | 39.7 | | |
| 12 | 60 | 272 | 40.0 | | |
| 13 | 54 | 259 | 29.6 | | |
| 14 | 61 | 265 | 30.6 | | |
| 15 | 58 | 267 | 29.0 | | |
| 16 | 45 | 225 | 32.7 | 4 | |
| 17 | 41 | 214 | 31.5 | 5 | |
| 18 | 34 | 203 | 29.5 | 5 | |
| 19 | 46 | 195 | 28.1 | 5 | 13.4 |
| 20 | 47 | 208 | 28.6 | 5 | 12.9 |
| 21 | 36 | 205 | 29.1 | 5 | |
| 22 | 52 | 213 | 30.6 | 5 | |
| 23 | 58 | 229 | 33.2 | 4 | |
| 24 | 53 | 198 | 27.2 | 4 | 11.8 |
| 25 | 47 | 192 | 28.4 | 5 | |
| 26 | 49 | 198 | 27.5 | 5 | 13.2 |
| 27 | 47 | 193 | 29.3 | 5 | |
| 28 | 39 | 183 | 24.8 | 5 | 11.7 |
| 29 | 47 | 211 | 28.8 | 5 | 14.0 |
| 30 | 46 | 224 | 31.2 | 5 | |
| 31 | 46 | 204 | 28.6 | 5 | 13.5 |
| 32 | 41 | 214 | 16.2 | 5 | |
| 33 | 43 | 222 | 16.4 | 5 | |
| 34 | 60 | 228 | 17.3 | 4 | |
| 35 | 41 | 183 | 15.0 | 5 | |
| 36 | 47 | 196 | 16.1 | 5 | |
| 37 | 44 | 226 | — | 5 | |
| 38 | 51 | 201 | 17.8 | 4 | 16.8 |
| C.E. 1 | 44 | 197 | 29.6 | 3 | |
| C.E. 2 | 40 | 193 | — | 3 | |
| C.E. 3 | 45 | 206 | 17.8 | 3 | |
| C.E. 4 | 41 | 196 | — | 3 | |

Melt temperature was obtained with a thermocouple hand probe. As this measurement requires a level of technique due to the manual method, it is subject to a high level of variation. Experience has shown that results can differ by up to 10° C. depending on operator and technique. In the case of these tests, care was taken to use the same operator per system of the (A) filler and the (B) polymer to minimize this error.

Extruder torque was noted as a relative percent of the extruder maximum torque.

Break strength was measured by producing five samples which were averaged. Testing was performed in accordance with ASTM D638-14.

Strand quality was assigned by visually evaluating for melt fracture, ability to maintain strength for pelletization, and roughness. Process conditions were set such that all formulations could be processed with a quality of 1 or greater and then kept constant for all other compositions. No changes to temperatures, total feed rates, screw speeds or other parameters were changed. This rating was used for wood filler based examples only due to the high potential for melt fracture with these compositions. Ratings are listed as follows:

0—could not strand
1—extensive melt fracture and strand breaking
2—extensive melt fracture, but not breaking
3—rough strand with medium melt fracture
4—minimal surface roughness or visible melt fracture
5—very smooth strand with no visible melt fracture Color (Y) was also measured on for many wood filled (5A and 5B) Examples to quantify the level of thermal decomposition occurring in the wood filler. The Y-value or the luminance was measure as a gauge of the darkening of the wood plastic composite during processing. Higher values of Y correspond to a lighter brown color of the wood. The Y value was measured using an average of 3 to 5 measurements on separate injection molded tensile dog bone samples using a BYK spectro-guide 45/0 gloss meter with D65 illuminant and 10 observer.

Examples 25 and 26 were composed of the same materials. Example 25 was produced with a pellet as previously described. Example 26 was produced by forcing the organopolysiloxane directly into the extruder. It can be seen by the results of these examples that they produced compositions of similar properties. The extruder torques and melt temperatures were slightly improved (lower torque and lower melt temperature) with the use of the pellet composition. Both of these formulations show substantial improvement over the comparative formulation (Comparative 42) without process aid shown in Table 15, showing that both options are effective at improving processing by reducing both extruder torque and polymer melt temperature. The tensile break strength was also similar in Examples 25 and Examples 26 with about 3% difference. This is very similar given the high level of variation of the filler being wood flour (5A).

Comparative Examples 1 and 2 were produced with a processing aid (C') of organopolysiloxane with a viscosity of 100 cst (1). Additional compositions were attempted at 4%, however it was not possible to mix the organopolysiloxane with the polymer at this level due to its very low viscosity. As result the 4% composition could not be processed into a uniform strand and unmixed organopolysiloxane would extrude from the die unmixed. The polymer pellets were also not able to be fed into the extruder screw and backed up into the feed throat. It was also discovered when molding the sample 2 into a test specimen that much of the very low viscosity organopolysiloxane prevented good mixing of the polymer and filler. As result, a large amount of the sample had very high loading of the Filler (5A) which resulted in over pressurizing the injection molding machine. Example 2 as result of this over pressuring could not be converted into a tensile specimen. This evidence of insufficient mixing suggests that the 100 cst organopolysiloxane is not an effective process aid for these examples of filled polymer systems due to being too low of viscosity.

Examples 39-57

Table 4 below shows the type and amounts of components utilized to prepare Examples 39-57. These were prepared as noted above for Examples 9-38.

TABLE 4

| Example | A | A (Wt %) | B | C | C (Wt %) | D | C (Wt %) | Format | Method of Prep |
|---|---|---|---|---|---|---|---|---|---|
| 39 | 1 | 50 | 2 | 4 | 2 | None | 0 | Liquid | 1 |
| 40 | 1 | 50 | 3 | 4 | 2 | None | 0 | Liquid | 1 |
| 41 | 4 | 50 | 3 | 4 | 4 | None | 0 | Pellet | 2 |

TABLE 4-continued

| Example | A | A (Wt %) | B | C | C (Wt %) | D | D (Wt %) | C Format | Method of Prep |
|---|---|---|---|---|---|---|---|---|---|
| 42 | 5B | 55 | 2 | 4 | 4 | None | 0 | Liquid | 1 |
| 43 | 5B | 55 | 3 | 7 | 2 | None | 0 | Liquid | 1 |
| 44 | 5B | 55 | 2 | 4 | 2 | None | 0 | Liquid | 1 |
| 45 | 5B | 55 | 2 | 3 | 2 | None | 0 | Liquid | 1 |
| 46 | 1 | 50 | 3 | 4 | 2 | 3 | 1 | Liquid | 1 |
| 47 | 4 | 50 | 3 | 4 | 2 | None | 0 | Pellet | 2 |
| 48 | 4 | 50 | 3 | 4 | 1 | None | 0 | Pellet | 2 |
| 49 | 4 | 50 | 3 | 4 | 2 | 3 | 1 | Pellet | 2 |
| 50 | 5B | 55 | 2 | 4 | 1 | None | 0 | Liquid | 1 |
| 51 | 5B | 55 | 3 | 2 | 2 | 3 | 1 | Liquid | 1 |
| 52 | 5B | 55 | 2 | 3 | 4 | 3 | 1 | Liquid | 1 |
| 53 | 5B | 55 | 3 | 3 | 2 | 3 | 1 | Liquid | 1 |
| 54 | 5B | 55 | 2 | 3 | 2 | 3 | 1 | Liquid | 1 |
| 55 | 5B | 55 | 3 | 7 | 2 | 3 | 1 | Liquid | 1 |
| 56 | 5B | 55 | 2 | 4 | 2 | 3 | 1 | Liquid | 1 |
| 57 | 5B | 55 | 2 | 3 | 1 | 3 | 1 | Liquid | 1 |

The (B) polymer 2 is a polypropylene homopolymer, having a melt flow rate (MFR) of 126 g/10 min as measured in accordance with ASTM D-1238M 230° C./2.16 kg).

The (B) polymer 3 is polypropylene, having a melt flow rate (MFR) of 2.0 g/10 min as measured in accordance with ASTM D1238 230° C./2.16 kg, and a density of 0.9 g/cm$^3$, as measured in accordance with ASTM D792.

The delivery method of the organopolysiloxane (C) was provided as a liquid or a solid. Liquid delivery was as previously described, while the Pellet format was combined with the polymer (B) at a ratio of 1:9. This was then blended with other polymer (B) to the desired weight percent.

The compositions of Examples 39-57 are extruded to give polymer composite articles using the methods previously described. The parameters associated with extrusion, as well as the average break strength of the injection molded polymer composite article formed by each Example, is set forth below in Table 5.

TABLE 5

| Example | Extruder Torque (%) | Melt Temperature (° C.) | Avg. Break Strength (MPa) |
|---|---|---|---|
| 39 | 27 | 216 | 14.3 |
| 40 | 37 | 228 | 16.8 |
| 41 | 45 | 248 | 18.7 |
| 42 | 39 | 193 | 19.3 |
| 43 | 52 | 225 | 20.9 |
| 44 | 42 | 204 | 20.9 |
| 45 | 43 | 201 | 21.1 |
| 46 | 38 | 234 | 22.4 |
| 47 | 48 | 252 | 22.9 |
| 48 | 48 | 252 | 26.6 |
| 49 | 51 | 260 | 35.0 |
| 50 | 46 | 204 | 38.1 |
| 51 | 51 | 226 | 42.8 |
| 52 | 41 | 199 | 43.4 |
| 53 | 51 | 226 | 44.7 |
| 54 | 45 | 204 | 45.8 |
| 55 | 52 | 224 | 46.0 |
| 56 | 44 | 205 | 46.5 |
| 57 | 47 | 207 | 47.1 |

Examples 58-82

Table 6 below shows the type and amounts of components utilized to prepare Examples 58-82. These were prepared as noted for examples 9 through 38.

TABLE 6

| Example | A | A (Wt %) | B | C | C (Wt %) | D | D (Wt %) | D Format | Method of Prep |
|---|---|---|---|---|---|---|---|---|---|
| 58 | 4 | 50 | 4 | 2 | 3 | None | 0 | Pellet | 2 |
| 59 | 4 | 50 | 4 | 4 | 3 | None | 0 | Pellet | 2 |
| 60 | 4 | 50 | 4 | 2 | 1.5 | None | 0 | Pellet | 2 |
| 61 | 5B | 55 | 4 | 7 | 2 | None | 0 | Liquid | 1 |
| 62 | 4 | 50 | 4 | 4 | 1.5 | None | 0 | Pellet | 2 |
| 63 | 2 | 50 | 4 | 4 | 1.5 | A | 1 | Pellet | 2 |
| 64 | 1 | 50 | 4 | 4 | 3 | A | 1 | Pellet | 2 |
| 65 | 1 | 50 | 4 | 2 | 1.5 | None | 0 | Pellet | 2 |
| 66 | 1 | 50 | 4 | 2 | 3 | None | 0 | Pellet | 2 |
| 67 | 1 | 50 | 4 | 4 | 3 | None | 0 | Pellet | 2 |
| 68 | 1 | 50 | 4 | 4 | 1.5 | A | 1 | Pellet | 2 |
| 69 | 1 | 50 | 4 | 4 | 1.5 | None | 0 | Pellet | 2 |
| 70 | 2 | 50 | 4 | 4 | 1.5 | None | 0 | Pellet | 2 |
| 71 | 4 | 50 | 4 | 4 | 3 | A | 1 | Pellet | 2 |
| 72 | 4 | 50 | 4 | 4 | 1.5 | A | 1 | Pellet | 2 |

TABLE 6-continued

| Example | A | A (Wt %) | B | C | C (Wt %) | D | D (Wt %) | D Format | Method of Prep |
|---|---|---|---|---|---|---|---|---|---|
| 73 | 5B | 55 | 4 | 2 | 4 | A | 1 | Liquid | 1 |
| 74 | 5B | 55 | 4 | 4 | 4 | A | 1 | Liquid | 1 |
| 75 | 5B | 55 | 4 | 7 | 4 | A | 1 | Liquid | 1 |
| 76 | 5B | 55 | 4 | 4 | 2 | A | 1 | Liquid | 1 |
| 77 | 5B | 55 | 4 | 2 | 2 | A | 1 | Liquid | 1 |
| 78 | 5B | 55 | 4 | 1 | 2 | A | 1 | Liquid | 1 |
| 79 | 5B | 55 | 4 | 1 | 1 | A | 1 | Liquid | 1 |
| 80 | 5B | 55 | 4 | 7 | 2 | A | 1 | Liquid | 1 |
| 81 | 5B | 55 | 4 | 7 | 1 | A | 1 | Liquid | 1 |
| 82 | 5B | 55 | 4 | 2 | 1 | A | 1 | Liquid | 1 |

The (B) polymer 4 is a linear low density polyethylene, having a melt flow rate (MFR) of 6.0 g/10 min as measured in accordance with ASTM D1238 190° C./2.16 kg, and a density of 0.92 g/cm$^3$, as measured in accordance with ASTM D792.

The delivery method of the organopolysiloxane (C) was provided as a liquid or a solid. Liquid delivery was as previously described, while the Pellet format was combined with the polymer (B) at a ratio of 1:9. This was then blended with other polymer (B) to the desired weight percent.

The compositions of Examples 58-82 were extruded to give polymer composite articles. These were processed as noted in Examples 9 through 38. The parameters associated with extrusion, as well as the average break strength of the injection molded polymer composite article formed by each Example, is set forth below in Table 7.

TABLE 7

| Example | Extruder Torque (%) | Melt Temperature (C.) | Avg. Break Strength (MPa) |
|---|---|---|---|
| 58 | 43 | 246 | 5.2 |
| 59 | 42 | 246 | 6.7 |
| 60 | 44 | 249 | 7.0 |
| 61 | 55 | 222 | 7.2 |
| 62 | 40 | 245 | 8.6 |
| 63 | 47 | 259 | 8.7 |
| 64 | 50 | 254 | 9.3 |
| 65 | 49 | 257 | 9.4 |
| 66 | 44 | 250 | 9.5 |
| 67 | 48 | 250 | 9.6 |
| 68 | 50 | 257 | 9.6 |
| 69 | 50 | 254 | 10.0 |
| 70 | 47 | 251 | 10.1 |
| 71 | 48 | 253 | 14.8 |
| 72 | 49 | 253 | 15.2 |
| 73 | 37 | 192 | 19.2 |
| 74 | 43 | 197 | 19.2 |
| 75 | 46 | 207 | 19.4 |
| 76 | 49 | 210 | 19.5 |
| 77 | 45 | 202 | 20.7 |
| 78 | 53 | 217 | 20.8 |
| 79 | 60 | 230 | 21.2 |
| 80 | 55 | 226 | 21.5 |
| 81 | 61 | 236 | 22.2 |
| 82 | 54 | 223 | 22.3 |

Examples 83-92

Table 8 below shows the type and amounts of components utilized to prepare Examples 83-92. These were prepared as noted for Examples 9 through 38.

TABLE 8

| Example | A | A (Wt %) | B | C | C (Wt %) | D | D (Wt %) | C Format | Method of Prep |
|---|---|---|---|---|---|---|---|---|---|
| 83 | 2 | 45 | 5 | 4 | 2 | None | 0 | Pellet | 2 |
| 84 | 1 | 45 | 5 | 7 | 2 | None | 0 | Pellet | 2 |
| 85 | 1 | 45 | 5 | 4 | 2 | None | 0 | Pellet | 2 |
| 86 | 4 | 45 | 5 | 4 | 2 | None | 0 | Pellet | 2 |
| 87 | 4 | 45 | 5 | 7 | 2 | None | 0 | Pellet | 2 |
| 88 | 4 | 45 | 5 | 7 | 1 | None | 0 | Pellet | 2 |
| 89 | 4 | 45 | 5 | 4 | 1 | None | 0 | Pellet | 2 |
| 90 | 5B | 40 | 5 | 4 | 2 | None | 0 | Liquid | 1 |
| 91 | 5B | 40 | 5 | 4 | 4 | None | 0 | Liquid | 1 |
| 92 | 5B | 40 | 5 | 7 | 2 | None | 0 | Liquid | 1 |

The (B) polymer 5 is Polyamide 12, having a melt flow rate (MFR) of 0.9 g/10 min as measured in accordance with ISO1133 235° C./5.0 kg, and a density of 1.0 g/cm$^3$, as measured in accordance with ASTM D792.

The delivery method of the organopolysiloxane (C) was provided as a liquid or a solid. Liquid delivery was as previously described, while the Pellet format was combined with the polymer (B) at a ratio of 1:9. This was then blended with other polymer (B) to the desired weight percent.

The compositions of Examples 83-92 are extruded to give polymer composite articles. The parameters associated with extrusion, as well as the average break strength of the injection molded polymer composite article formed by each Example, is set forth below in Table 9.

TABLE 9

| Example | Extruder Torque (%) | Melt Temperature (C.) | Avg. Break Strength (MPa) |
|---|---|---|---|
| 83 | 67 | 280 | 32.8 |
| 84 | 70 | 295 | 39.0 |
| 85 | 70 | 290 | 39.7 |

TABLE 9-continued

| Example | Extruder Torque (%) | Melt Temperature (C.) | Avg. Break Strength (MPa) |
|---|---|---|---|
| 86 | 64 | 287 | 47.0 |
| 87 | 61 | 289 | 48.1 |
| 88 | 66 | 291 | 50.9 |
| 89 | 66 | 288 | 51.9 |
| 90 | 60 | 268 | 59.9 |
| 91 | 48 | 256 | 53.2 |
| 92 | 68 | 263 | 59.1 |

Examples 93-94

Table 10 below shows the type and amounts of components utilized to prepare Examples 93-94. These were prepared as noted for Examples 9 through 38.

TABLE 10

| Example | A | A (Wt %) | B | C | C (Wt %) | D | D (Wt %) | C Format | Method of Prep |
|---|---|---|---|---|---|---|---|---|---|
| 93 | 6 | 43 | 6 | 4 | 2 | None | 0 | Liquid | 1 |
| 94 | 6 | 43 | 6 | 7 | 2 | None | 0 | Liquid | 1 |

The (A) filler 6 is a glass fiber that was sourced pre-compounded at 43 weight percent with (B) polymer 6 which is a polyamide 66 with a combined density of 1.49 g/cm3, as measured in accordance with ISO 1183. It was then processed through the extruder with the addition of the (C) organopolysiloxane.

The compositions of Examples 93-94 are extruded to give polymer composite articles. The parameters associated with extrusion, of the polymer composite article formed by each Example, is set forth below in Table 11.

TABLE 11

| Example | Extruder Torque (%) | Melt Temperature (C.) |
|---|---|---|
| 93 | 63 | 282 |
| 94 | 61 | 283 |

Example 95

Table 12 below shows the type and amounts of components utilized to prepare Example 95. Example 95 was prepared as noted for Examples 9 through 38.

TABLE 12

| Example | A | A (Wt %) | B | C | C (Wt %) | D | D (Wt %) | C Format | Method of Prep |
|---|---|---|---|---|---|---|---|---|---|
| 95 | 7 | 30 | 7 | 7 | 2 | None | 0 | Liquid | 1 |

The (A) filler 7 is a carbon fiber, 6 mm nominal length, with a bulk density of 500 grams/liter, with a polyamide based sizing agent of 1.5-3.0 weight percent of the filler weight.

The (B) polymer 7 is a polyamide 6 with a relative viscosity (RV) (1% [m/v] in 96% [m/m] sulfuric acid) of 2.62-2.83 according to ISO 307, calculated by Huggins method and a density of 1.12-1.15 g/cm$^3$, as measured in accordance with ISO 1183.

The composition of Example 95 is extruded to give polymer composite articles. The parameters associated with extrusion, of the polymer composite article formed by the Example, is set forth below in Table 13.

TABLE 13

| Example | Extruder Torque (%) | Melt Temperature (C.) |
|---|---|---|
| 60 | 60 | 285 |

Migration testing of Examples 19, 27, 36 and Comparative Example 46

Each composite article (4.0 g) was placed in a single layer in a tared aluminum pan lined with a Whatman® #44 filter paper. The composite article was then placed in a non-vented oven at 70° C. for 28 days. The composite article was removed and the filter paper was placed in 40 ml scintillation vial.

The amount of silicone was determined using size exclusion chromatography (SEC). The silicone sample solutions were prepared in toluene at concentration 5 mg/mL. The submitted filter paper was cut into four smaller pieces, placed in a vial where the toluene was added to extract the silicone. The solution was shaken at a flat-bed shaker at RT for 4-6 hours and filtered through a 0.45 PTFE syringe filter prior to injection.

The molecular weight and concentration of the extracted material was determined by SEC with multi-angle laser light scattering and differential refractive index detection (SEC-MALLS-DRI). The SEC was based on an Agilent 1260 LC pump and autosampler. Flow rate was set up at 1 mL/min and injection volume was 100 uL of solution. Separation was carried using two mixed C column held at 35° C. The detectors were Wyatt HELEO II MALLS and DRI. MALLS was equipped with red laser having wavelength at 660 nm and operated at 35 C. DRI was equipped with a LED with the same wavelength as that used in MALLS (660 nm) and operated at 35° C.

Wyatt Astra 6 was used for data collection and Astra 7 was used for data reduction. The specific refractive index (dn/dc) of PS and PDMS were 0.110 mL/g and −0.086 mL/g. Zimm formalism with 1st order fitting was used to obtain M of each SEC elution slice. Detected PDMS mass was determined by integration of the DRI signal using dn/dc of −0.086 mL/g (PDMS), and mass recovery was obtained by comparing the detected mass to the injected mass.

The determination of silicone mass is calculated as follows:

$$W(PDMS, mg) = (W(DRI, \mu g) \times 10^{-3})/(Vol(Inj, mL)) \times V(toluene, mL),$$

where W (PDMS, mg) is the determined mass of PDMS (mg) on filter paper; W (DRI, µg) is the detected mass (µg) by DRI signal using dn/dc of −0.086 mL/g; Vol (inj, mL) is SEC injection volume that is set up 0.1 mL; V (toluene) is the volume of toluene added in sample preparation (~10 mL). The results are set forth below in Table 14.

TABLE 14

| Example | Toluene (g) | Total mass Siloxane (mg) | Total mass extracted (mg) |
|---|---|---|---|
| 19 | 8.6725 | 60 | 0 |
| 27 | 8.6208 | 80 | 0 |
| 36 | 8.6628 | 80 | 0 |
| C.E. 46 | 8.6519 | 80 | 0.27 |

Examples 19, 27 and 36 showed no evidence of silicone bleeding (0 mg extracted). The comparative sample showed a trace amount of material that may be silicone. The peak is most likely attributed to contamination of the sample.

Comparative Examples 5-50

Table 15 below shows the type and amounts of components utilized to prepare Comparative Examples 5-50, where C. E. indicates comparative example.

TABLE 15

| Example | A | A (Wt %) | B | C | C (Wt %) | D | D (Wt %) | Method of Prep |
|---|---|---|---|---|---|---|---|---|
| C.E. 5 | 1 | 50 | 2 | None | 0 | None | 0 | 1 |
| C.E. 6 | 1 | 50 | 3 | None | 0 | None | 0 | 1 |
| C.E. 7 | 1 | 50 | 3 | None | 0 | C | 1 | 1 |
| C.E. 8 | 1 | 50 | 4 | None | 0 | None | 0 | 2 |
| C.E. 9 | 1 | 50 | 4 | None | 0 | A | 1 | 2 |
| C.E. 10 | 1 | 50 | 4 | Comparative A | 3 | A | 1 | 2 |
| C.E. 11 | 1 | 50 | 4 | Comparative A | 3 | None | 0 | 2 |
| C.E. 12 | 1 | 50 | 5 | None | 0 | None | 0 | 2 |
| C.E. 13 | 2 | 50 | 4 | None | 0 | A | 1 | 2 |
| C.E. 14 | 2 | 50 | 4 | None | 0 | A | 1 | 2 |
| C.E. 15 | 2 | 50 | 4 | Comparative A | 3 | A | 1 | 2 |
| C.E. 16 | 4 | 50 | 3 | None | 0 | None | 0 | 2 |
| C.E. 17 | 4 | 50 | 3 | None | 0 | C | 1 | 2 |
| C.E. 18 | 4 | 50 | 3 | Comparative B | 4 | None | 0 | 2 |
| C.E. 19 | 4 | 50 | 3 | Comparative B | 2 | None | 0 | 2 |
| C.E. 20 | 4 | 50 | 4 | None | 0 | None | 0 | 2 |
| C.E. 21 | 4 | 50 | 4 | None | 0 | A | 1 | 2 |
| C.E. 22 | 4 | 50 | 4 | Comparative A | 3 | None | 0 | 2 |
| C.E. 23 | 4 | 50 | 5 | None | 0 | None | 0 | 2 |
| C.E. 24 | 4 | 50 | 1 | None | 0 | None | 0 | 2 |
| C.E. 25 | 4 | 50 | 1 | None | 0 | B | 2 | 2 |
| C.E. 26 | 3 | 50 | 1 | None | 0 | None | 0 | 1 |
| C.E. 27 | 3 | 50 | 1 | None | 0 | B | 1.5 | 1 |
| C.E. 28 | 3 | 50 | 1 | Comparative A | 2 | None | 0 | 1 |
| C.E. 29 | 5B | 55 | 2 | None | 0 | None | 0 | 1 |
| C.E. 30 | 5B | 55 | 2 | None | 0 | C | 1 | 1 |
| C.E. 31 | 5B | 55 | 2 | Comparative B | 2 | None | 0 | 1 |
| C.E. 32 | 5B | 55 | 2 | Comparative B | 2 | C | 1 | 1 |
| C.E. 33 | 5B | 55 | 3 | None | 0 | None | 0 | 1 |
| C.E. 34 | 5B | 55 | 3 | None | 0 | C | 1 | 1 |
| C.E. 35 | 5B | 55 | 4 | None | 0 | None | 0 | 1 |
| C.E. 36 | 5B | 55 | 4 | None | 0 | A | 1 | 1 |

TABLE 15-continued

| Example | A | A (Wt %) | B | C | C (Wt %) | D | D (Wt %) | Method of Prep |
|---|---|---|---|---|---|---|---|---|
| C.E. 37 | 5B | 55 | 4 | Comparative A | 2 | None | 0 | 1 |
| C.E. 38 | 5B | 55 | 4 | Comparative A | 2 | A | 1 | 1 |
| C.E. 39 | 5A | 55 | 1 | None | 0 | None | 0 | 1 |
| C.E. 40 | 5B | 55 | 1 | None | 0 | None | 0 | 1 |
| C.E. 41 | 5A | 55 | 1 | None | 0 | A | 1.5 | 1 |
| C.E. 42 | 5A | 55 | 1 | Comparative A | 6 | None | 0 | 1 |
| C.E. 43 | 5A | 55 | 1 | Comparative A | 6 | A | 1.5 | 1 |
| C.E. 44 | 5A | 55 | 1 | Comparative A | 4 | A | 1.5 | 1 |
| C.E. 45 | 5A | 55 | 1 | Comparative A | 2 | None | 0 | 1 |
| C.E. 46 | 5A | 55 | 1 | Comparative A | 2 | A | 1.5 | 1 |
| C.E. 47 | 5A | 55 | 1 | Comparative B | 4 | None | 0 | 1 |
| C.E. 48 | 5A | 55 | 1 | Comparative B | 4 | A | 1.5 | 1 |
| C.E. 49 | 5B | 40 | 5 | None | 0 | None | 0 | 1 |

The (C) Comparative A is a blend of an aliphatic carboxylic acid salts and mono and diamides.

The (C) Comparative B is a blend of complex, modified fatty acid ester (having a specific gravity of 1.005).

The compositions of Comparative Examples 5-50 are extruded to give comparative polymer composite articles. These were prepared as noted for examples 9 through 38 with process parameters unchanged for each respective filler (A) and polymer (B) system. The parameters associated with extrusion, as well as the average break strength of the comparative polymer composite article formed by each Comparative Example, is set forth below in Table 16.

TABLE 16

| Comparative Example | Extruder Torque (%) | Melt Temperature (C.) | Avg. Break Strength (MPa) | Strand Quality | Color (Y) |
|---|---|---|---|---|---|
| C.E. 5 | 33 | 214 | 19.3 | | |
| C.E. 6 | 57 | 244 | 20.3 | | |
| C.E. 7 | 51 | 240 | 27.9 | | |
| C.E. 8 | 53 | 256 | 9.7 | | |
| C.E. 9 | 55 | 256 | 10.2 | | |
| C.E. 10 | 45 | 252 | 8.7 | | |
| C.E. 11 | 36 | 247 | 10.4 | | |
| C.E. 12 | 76 | 291 | 45.9 | | |
| C.E. 13 | 23 | 258 | 9.3 | | |
| C.E. 14 | 49 | 253 | 10.7 | | |
| C.E. 15 | 43 | 252 | 9.4 | | |
| C.E. 16 | 60 | 259 | 33.9 | | |
| C.E. 17 | 58 | 264 | 43.0 | | |
| C.E. 18 | 39 | 244 | 24.6 | | |
| C.E. 19 | 46 | 252 | 24.7 | | |
| C.E. 20 | 44 | 255 | 14.6 | | |
| C.E. 21 | 53 | 258 | 17.2 | | |
| C.E. 22 | 39 | 244 | 9.2 | | |
| C.E. 23 | 69 | 292 | 56.8 | | |
| C.E. 24 | 64 | 269 | 37.6 | | |
| C.E. 25 | | | 43.6 | | |
| C.E. 26 | 62 | 214 | 19.4 | | |
| C.E. 27 | 65 | 216 | 30.8 | | |
| C.E. 28 | 51 | 219 | 29.3 | | |
| C.E. 29 | 54 | 205 | 25.9 | | |
| C.E. 30 | 54 | 205 | 50.5 | | |
| C.E. 31 | 45 | 202 | 21.8 | | |
| C.E. 32 | 43 | 200 | 28.6 | | |
| C.E. 33 | 70 | 240 | 26.8 | | |
| C.E. 34 | 71 | 248 | 50.8 | | |
| C.E. 35 | 66 | 236 | 10.0 | | |
| C.E. 36 | 69 | 240 | 22.2 | | |
| C.E. 37 | 50 | 232 | 9.8 | | |
| C.E. 38 | 63 | 249 | 20.3 | | |
| C.E. 39 | 62 | 212 | 20.1 | 1 | |
| C.E. 40 | 58 | 246 | — | 2 | |
| C.E. 41 | 62 | 217 | 32.9 | 1 | 10.3 |
| C.E. 42 | 35 | 185 | 16.9 | 5 | 11.0 |
| C.E. 43 | 41 | 200 | 18.9 | 4 | 10.2 |
| C.E. 44 | 45 | 202 | 20.1 | 4 | 10.7 |
| C.E. 45 | 48 | 200 | 21.9 | 3 | 11.9 |
| C.E. 46 | 58 | 210 | 30.6 | 3 | 9.0 |
| C.E. 47 | 37 | 192 | 18.2 | 4 | |
| C.E. 48 | 38 | 191 | 19.6 | 5 | |
| C.E. 49 | 83 | 280 | 60.3 | | |

The examples in Table 16 give strand quality and color as is described for examples 9 through 38. These were only measured for Examples of Polymer (B) as 1 and Filler (A) as 5B as described for examples 9 through 38.

The differences in the wood flour lots 5A and 5B resulted in discrete sets of process results of extruder torque and melt temperature and only have correlation within their sets. This difference in processing results can be seen in the example "Comparative 35" where lot 5A resulted in a melt temperature of 212° C. while "Comparative 36" produced with Filler 5B resulted in a melt temperature of 246° C. Specifics of the lots were not analyzed, however variation in wood flour is to be expected as a function of variations in tree type, bark content, time of harvest, etc.

INDUSTRIAL APPLICABILITY

Without wishing to be bound by theory, the composition provided herein may provide one or more of the following benefits: faster compounding through put, lower melt temperatures, lower pressures in extruders used to fabricate polymer composite articles from the composition, faster molding, better demolding, and lower reject rates. In addition, the (C) organopolysiloxane may improve filler dispersion, reduce fiber break up and reduce filler particle agglomeration.

Many manufacturers of polymer composite articles have existing equipment such as extruders, which are configured for solids feeds, and are not set up to feed liquids to form polymer composite articles. Providing a pellet comprising the (C) organopolysiloxane, where the pellet is a solid at 25° C. and 1 atmosphere solves this problem and facilitates mixing and dispersion of the (C) organopolysiloxane in the polymer composite article.

Definitions and Usage of Terms

Unless otherwise indicated by the context of the specification, all amounts, ratios and percentages are by weight, and all test methods are current as of the filing date of this disclosure. The articles "a", "an" and "the" each refer to one or more. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise at least one polymerized comonomer.

The term, "ethylene-based polymer," as used herein, refers to a polymer that comprises a majority amount of polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes resins made using the traditional Ziegler-Natta catalyst systems as well as single-site catalysts such as bis-metallocenes (sometimes referred to as "m-LLDPE"), post-metallocene catalysts, and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.940 g/cm$^3$. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities greater than about 0.940 g/cm$^3$, which are generally prepared with Ziegler-Natta catalysts, chrome catalysts or even metallocene catalysts.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

What is claimed is:

1. A composition for preparing a polymer composite article, said composition comprising:
   (A) a filler in an amount of from 10 to 90 wt. %, said (A) filler comprising a lignocellulosic filler;
   (B) a polymer in an amount of from 10 to 90 wt. %, wherein said (B) polymer is selected from polyolefins, polyamides, polyesters, or combinations thereof; and
   (C) an organopolysiloxane in an amount of from greater than 0 to 10 wt. %; the (C) organopolysiloxane having at least one silicon-bonded hydroxyl group and a viscosity of from 1,000 to 60,000 mPa·s at 25° C.;
   each based on the total weight of components (A), (B) and (C) in said composition.

2. The composition of claim 1, wherein: (i) said (C) organopolysiloxane is present as a liquid at 25° C.; (ii) said organopolysiloxane is present in said composition in a solid carrier component comprising said organopolysiloxane; (iii) said (C) organopolysiloxane has a viscosity of from 4,000 to 50,000 mPa·s at 25° C.; or (iv) any combination of (i) to (iii).

3. The composition of claim 1, wherein said (C) organopolysiloxane has the following average unit formula:

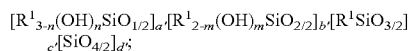

wherein each R$^1$ is an independently selected hydrocarbyl group; n is 0, 1, 2, or 3, m is 0, 1 or 2, with the proviso that n and m are not simultaneously 0; 0<a'<1; 0<b'<1; 0≤c'≤0.1; and 0≤d'≤0.1, with the proviso that a'+b'+c'+d'=1.

4. The composition of claim 1, wherein said (C) organopolysiloxane has the following average unit formula (I) or (II):

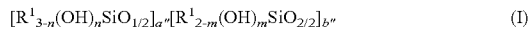

wherein each R$^1$ is an independently selected hydrocarbyl group; n is 0, 1, 2, or 3, m is 0, 1 or 2, with the proviso that n and m are not simultaneously 0; 0≤a"<1; 0≤b"<1; with the proviso that a"+b"=1; or

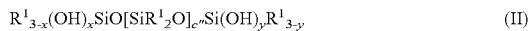

wherein each R$^1$ is an independently selected hydrocarbyl group; x is 0, 1, 2, or 3, y is 0, 1, 2, or 3, with the proviso that x and y are not simultaneously 0; and c" is from 60 to 1,200.

5. The composition claim 1, wherein: (i) said (A) filler is a lignocellulosic filler and is present in an amount of from 40 to 80 wt. %; (ii) said (B) polymer comprises a polyolefin and is present in an amount of from 20 to 60 wt. %; and (iii) said (C) organopolysiloxane is present in an amount of from 0.8 to 4.0 wt. %.

6. The composition of claim 1, wherein: (i) said (B) polymer is present in an amount of from 50 to 90 wt. %; (ii) said (C) organopolysiloxane is present in an amount of from 0.1 to 10 wt. %; and (iii) said (C) organopolysiloxane has a viscosity of from 1,000 to 50,000 mPa·s at 25° C.

7. The composition of claim 1, wherein: (i) said (B) polymer is present in an amount of from 20 to 40 wt. %; (ii) said (C) organopolysiloxane is present in an amount of from 0.1 to 10 wt. %; and (iii) said (C) organopolysiloxane has a viscosity of from 1,000 to 50,000 mPa·s at 25° C.

8. The composition of claim 1, further comprising one or more additives selected from (D) a compatibilizer, (E) a colorant, (F) a blowing agent, (G) a UV stabilizer, (H) an antioxidant, (I) a process aid, (J) a preservative, (K) a biocide, (L) a flame retardant, and (M) an impact modifier.

9. A method of preparing the composition of claim 1, said method comprising:
   combining (A) said filler, (B) said polymer, and (C) said organopolysiloxane, thereby preparing the composition.

10. A method of preparing a polymer composite article, said method comprising:
    mixing the composition of claim 1; and
    preparing the polymer composite article from the composition.

11. The method of claim 10, wherein the method further comprises (i) heating the (B) polymer to melt the (B) polymer prior to and/or during forming the composition; (ii) mixing a mixture of the (A) filler and (C) organopolysiloxane prior to adding the (B) polymer or (iii) both (i) and (ii).

12. The method of claim 10, wherein the method comprises:
    combining the (A) filler, the (B) polymer, and the (C) organopolysiloxane at an elevated temperature under mixing to give a flowable mixture; and
    forming the polymer composite article from the composition.

13. The method of claim 12, wherein: (i) the (C) organopolysiloxane is a liquid when combining the flowable mixture with the (C) organopolysiloxane; or (ii) the (C) organopolysiloxane is present within a solid carrier component and the method further comprises melting the solid carrier component when combining the flowable mixture and the (C) organopolysiloxane.

14. The method of claim 10, wherein: (i) preparing the polymer composite article from the composition further comprises forming the composition into a desired shape; (ii) preparing the polymer composite article from the composition comprises extruding the composition; (iii) preparing the polymer composite article from the composition comprises molding the composition; or (iv) any combinations of (i) to (iii).

15. The method of claim 10 carried out in an extruder, wherein: (i) an extrusion processing temperature of the composition in the extruder is reduced as compared to an extrusion processing temperature of a mixture of the (A) filler and the (B) polymer without the (C) organopolysiloxane; and/or (ii) a torque of the extruder is reduced when mixing the composition as compared to a torque of the extruder when extruding a mixture of the (A) filler and the (B) polymer without the (C) organopolysiloxane.

16. A polymer composite article prepared by the method of claim 10.

17. The composition of claim 1, wherein said (A) filler is present in an amount of from 35 to 80 wt. % based on the total weight of components (A), (B) and (C) in said composition.

* * * * *